US012564194B2

(12) United States Patent
Yuan et al.

(10) Patent No.: US 12,564,194 B2
(45) Date of Patent: Mar. 3, 2026

(54) HERBICIDE MIXTURE, HERBICIDAL COMPOSITION, METHOD AND KIT FOR CONTROLLING UNDESIRED VEGETATION

(71) Applicants: Adama Agan Ltd., Ashdod (IL); Chuanwei Yuan, Beijing (CN)

(72) Inventors: Chuanwei Yuan, Beijing (CN); Hadas Miryamchik, Ashdod (IL); Ehud Yogev, Ashdod (IL); Peng Wang, Beijing (CN)

(73) Assignee: ADAMA AGAN LTD., Ashdod (IL)

( * ) Notice: Subject to any disclaimer, the term of this patent is extended or adjusted under 35 U.S.C. 154(b) by 352 days.

(21) Appl. No.: 18/249,305

(22) PCT Filed: Oct. 15, 2021

(86) PCT No.: PCT/CN2021/124092
§ 371 (c)(1),
(2) Date: Apr. 17, 2023

(87) PCT Pub. No.: WO2022/078494
PCT Pub. Date: Apr. 21, 2022

(65) Prior Publication Data

US 2024/0284912 A1 Aug. 29, 2024

(30) Foreign Application Priority Data

Oct. 15, 2020 (CN) ......................... 202011105597.8

(51) Int. Cl.
*A01N 47/36* (2006.01)
*A01N 43/00* (2006.01)
*A01N 43/80* (2006.01)
*A01N 47/30* (2006.01)
*A01P 13/00* (2006.01)

(52) U.S. Cl.
CPC ............. *A01N 47/36* (2013.01); *A01N 43/00* (2013.01); *A01N 43/80* (2013.01); *A01N 47/30* (2013.01); *A01P 13/00* (2021.08)

(58) Field of Classification Search
CPC ........ A01N 47/36; A01N 43/80; A01N 47/30; A01N 43/00; A01P 13/00
See application file for complete search history.

(56) References Cited

U.S. PATENT DOCUMENTS

2011/0015067 A1* 1/2011 Sievernich ............ A01N 43/80 504/136

FOREIGN PATENT DOCUMENTS

| | | | |
|---|---|---|---|
| CN | 107836452 | A | 3/2018 |
| CN | 109964943 | A | 7/2019 |
| CN | 111362917 | A | 7/2020 |
| WO | 2013127860 | A1 | 9/2013 |
| WO | 2016121898 | A1 | 8/2016 |
| WO | 2020154349 | A1 | 7/2020 |

* cited by examiner

*Primary Examiner* — Ali Soroush
*Assistant Examiner* — Andriae M Holt
(74) *Attorney, Agent, or Firm* — VOLPE KOENIG

(57) ABSTRACT

The present disclosure relates to an herbicide mixture comprising pyroxasulfone, chlorotoluron and mesosulfuron-methyl. The present disclosure also relates to an herbicidal composition comprising pyroxasulfone, chlorotoluron, mesosulfuron-methyl and at least one agricultural carrier. The present disclosure also relates to a method and kit for controlling undesirable vegetation.

12 Claims, No Drawings

HERBICIDE MIXTURE, HERBICIDAL COMPOSITION, METHOD AND KIT FOR CONTROLLING UNDESIRED VEGETATION

CROSS REFERENCE TO RELATED APPLICATIONS

This application is a 35 U.S.C. § 371 national stage of International Application No. PCT/CN2021/124092, which was filed Oct. 15, 2021 and claims the benefit of CN patent application No. 202011105597.8, filed Oct. 15, 2020, both of which are incorporated by reference herein as if fully set forth.

TECHNICAL FIELD

The present disclosure relates to an herbicide mixture comprising pyroxasulfone, chlorotoluron and mesosulfuron-methyl. The present disclosure also relates to an herbicidal composition, which comprises pyroxasulfone, chlorotoluron, mesosulfuron-methyl, and at least one agricultural carrier. The present disclosure discloses a method for controlling undesirable vegetation, which includes applying an herbicidally effective amount of the herbicide mixture or the herbicidal composition disclosed herein to the undesirable vegetation or its location. The present disclosure also discloses a kit comprising the herbicide mixture or the herbicidal composition disclosed herein.

BACKGROUND ART

In order to obtain high crop efficiency, the control of undesirable vegetation is extremely important. In many cases, although herbicides have an effect on a certain weed lineage, they do not fight against other types of weeds; and these types of weeds are also present in the crops to be protected. Therefore, there is an urgent need to mix two, three or more herbicides. In addition, the application of two, three or more active ingredients of herbicide with different functioning manners may bring many advantages, such as expanded weed lineage, reduced application rate, reduced number of applications, and in some cases synergy effect (wherein the efficacy increases).

Compared with applying a single herbicide, a mixture of selected herbicides may also have the following advantages, including: (a) increasing the lineage of the weeds to be controlled, or extending the control of weeds for a longer period of time; (b) improving crop safety, applying the lowest dosage of the selected multiple herbicides in a combination instead of a single high dosage of one herbicide, and (c) delaying sprouting of the weed species resistant to the selected multiple herbicides (Int. J. Agri. Biol., Vol. 6, No. 1, 2004, pp. 209-212).

However, the performance of the activity and selectivity of any specific mixture is difficult to predict, since the performance of each single herbicide in the mixture is often affected by the presence of the other herbicide(s). Moreover, the activity of the mixture may also vary significantly depending on chemical properties, plant species, growth stage, environmental conditions, application rate, and so on.

Pyroxasulfone, 3-[(5-difluoromethoxy-1-methyl-3-trifluoromethylpyrazol-4-yl)methylsulfonyl]-4,5-dihydro-5,5-dimethyl-1,2-isoxazole, with a structural formula of

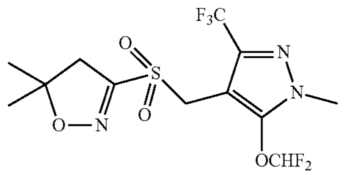

is disclosed in WO2002062770A1 by Kumiai Chemical Industry Co., Ltd. etc. The CAS registry number of pyroxasulfone is 447399-55-5, and it is an herbicide of elongation synthase inhibitor of very long chain fatty acid. As a soil treatment agent, it may be used in crops such as wheat, corn, peanut, soybean, and cotton to control multiple kinds of gramineous weeds and broad-leaved weeds, such as *Setaria* P. Beauv., *Digitaria, Echinochloa* Beauv., etc.

The chemical name of chlorotoluron is 3-(3-chloro-4-methylphenyl)-N,N-dimethylurea, with a structural formula of

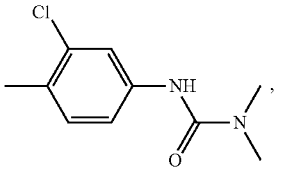

and its CAS registry number is 15545-48-9. Chlorotoluron is a photosynthetic electron transport inhibitor, which may be used in wheat, corn, soybeans and other crops to control a variety of gramineous weeds and broad-leaved weeds, such as *Capsella bursa-pastoris, Galium aparine* L. and so on.

Mesosulfuron-methyl, i.e., 2-[3-(4,6-dimethoxypyrimidin-2-yl)urea sulfonyl]-4-methylsulfonamide methyl benzoate, with a structural formula of

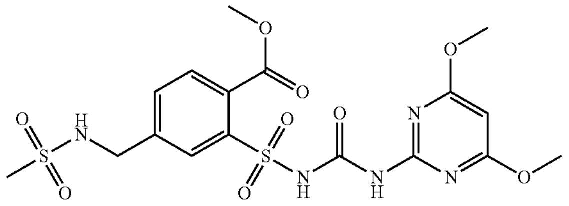

is disclosed in WO1995010507A1 by Hoechst Schering Agrevo GMBH. Mesosulfuron-methyl has CAS registry number 208465-21-8, it is an acetolactate synthase inhibitor and may be used in wheat and other crops to control a variety of gramineous weeds and broad-leaved weeds, such as *Alopecurus aequalis* Sobol., *Avena fatua* L. and so on.

There is a continuing need in the art for herbicide mixtures, herbicidal compositions, methods, and kits for controlling growth of undesirable vegetation.

CONTENTS OF THE INVENTION

According to one aspect, the present disclosure provides an herbicide mixture comprising pyroxasulfone, chlorotoluron and mesosulfuron-methyl.

According to another aspect, the present disclosure relates to an herbicidal composition comprising pyroxasulfone, chlorotoluron, mesosulfuron-methyl and at least one agricultural carrier.

According to another aspect, the present disclosure provides a method for controlling undesirable vegetation, which includes applying an herbicidally effective amount of the herbicide mixture or the herbicidal composition of the present disclosure to the undesirable vegetation or its location.

According to another aspect, the present disclosure provides a kit comprising the herbicide mixture or the herbicidal composition of the present disclosure.

More particularly, the present disclosure provides the following schemes:

1. An herbicide mixture comprising pyroxasulfone, chlorotoluron and mesosulfuron-methyl.

2. The herbicide mixture according to scheme 1, wherein the weight ratio of pyroxasulfone, chlorotoluron and mesosulfuron-methyl is (20-360):(250-4500):(5-20).

3. The herbicide mixture according to scheme 2, wherein the weight ratio of pyroxasulfone, chlorotoluron and mesosulfuron-methyl is (40-200):(250-4500):(5-20).

4. The herbicide mixture according to scheme 3, wherein the weight ratio of pyroxasulfone, chlorotoluron and mesosulfuron-methyl is (40-200):(500-2500):(5-20).

5. The herbicide mixture according to scheme 3, wherein the weight ratio of pyroxasulfone, chlorotoluron and mesosulfuron-methyl is (45-180):(560-2250):(5-20).

6. The herbicide mixture according to scheme 2, wherein the weight ratio of pyroxasulfone, chlorotoluron and mesosulfuron-methyl is (40-200):(300-1500):(5-20).

7. The herbicide mixture according to scheme 6, wherein the weight ratio of pyroxasulfone, chlorotoluron and mesosulfuron-methyl is (80-200):(500-1200):(5-20).

8. The herbicide mixture of scheme 6, wherein the weight ratio of pyroxasulfone, chlorotoluron and mesosulfuron-methyl is (90-180):(560-1125):(5-20).

9. The herbicide mixture according to scheme 6, wherein the weight ratio of pyroxasulfone, chlorotoluron and mesosulfuron-methyl is (3.5-5.5):(20-40):1; (7-11):(100-120):1; or (26-46):(215-235):1.

10. The herbicide mixture of scheme 6, wherein the weight ratio of pyroxasulfone, chlorotoluron and mesosulfuron-methyl is 4.5:28.125:1; 9:112.5:1; or 36:225:1.

11. The herbicide mixture according to any one of schemes 1-10, wherein pyroxasulfone, chlorotoluron and mesosulfuron-methyl are applied in combination or sequentially.

12. The herbicide mixture according to any one of schemes 1-11, wherein the application rate of the herbicide mixture is 153.125-2450 g ai/ha.

13. The herbicide mixture according to any one of schemes 1-12, wherein the application rate of pyroxasulfone is 11.25-180 g ai/ha, the application rate of chlorotoluron is 140.625-2250 g ai/ha, and the application rate of mesosulfuron-methyl is 1.25-20 g ai/ha.

14. The herbicide mixture according to any one of schemes 1-13, wherein the application rate of pyroxasulfone is 45-180 g ai/ha, the application rate of chlorotoluron is 562.5-2250 g ai/ha, and the application rate of mesosulfuron-methyl is 5-20 g ai/ha.

15. The herbicide mixture according to any one of schemes 1-14, wherein the herbicide mixture is synergistic.

16. The herbicide mixture according to any one of schemes 1-15, wherein the herbicide mixture consists of pyroxasulfone, chlorotoluron and mesosulfuron-methyl.

17. An herbicidal composition comprising pyroxasulfone, chlorotoluron, mesosulfuron-methyl, and at least one agricultural carrier.

18. The herbicidal composition according to scheme 17, further comprising a surfactant.

19. The herbicidal composition according to scheme 17 or 18, wherein the weight ratio of pyroxasulfone, chlorotoluron and mesosulfuron-methyl is (20-360):(250-4500):(5-20).

20. The herbicidal composition according to scheme 19, wherein the weight ratio of pyroxasulfone, chlorotoluron and mesosulfuron-methyl is (40-200):(250-4500):(5-20).

21. The herbicidal composition according to scheme 20, wherein the weight ratio of pyroxasulfone, chlorotoluron and mesosulfuron-methyl is (40-200):(500-2500):(5-20).

22. The herbicidal composition according to scheme 20, wherein the weight ratio of pyroxasulfone, chlorotoluron and mesosulfuron-methyl is (45-180):(560-2250):(5-20).

23. The herbicidal composition according to scheme 19, wherein the weight ratio of pyroxasulfone, chlorotoluron and mesosulfuron-methyl is (40-200):(300-1500):(5-20).

24. The herbicidal composition according to scheme 23, wherein the weight ratio of pyroxasulfone, chlorotoluron and mesosulfuron-methyl is (80-200):(500-1200):(5-20).

25. The herbicidal composition according to scheme 23, wherein the weight ratio of pyroxasulfone, chlorotoluron and mesosulfuron-methyl is (90-180):(560-1125):(5-20).

26. The herbicidal composition according to scheme 23, wherein the weight ratio of pyroxasulfone, chlorotoluron and mesosulfuron-methyl is (3.5-5.5):(20-40):1; (7-11):(100-120):1; or (26-46):(215-235):1.

27. The herbicidal composition according to scheme 23, wherein the weight ratio of pyroxasulfone, chlorotoluron and mesosulfuron-methyl is 4.5:28.125:1; 9:112.5:1; or 36:225:1.

28. The herbicidal composition according to any one of schemes 17-27, wherein pyroxasulfone, chlorotoluron and mesosulfuron-methyl are applied in combination or sequentially.

29. The herbicidal composition according to any one of schemes 17-28, wherein the application rate of the composition is 1225-2450 g ai/ha.

30. The herbicidal composition according to any one of schemes 17-29, wherein the application rate of pyroxasulfone is 11.25-180 g ai/ha, the application rate of chlorotoluron is 140.625-2250 g ai/ha, and the application rate of mesosulfuron-methyl is 1.25-20 g ai/ha.

31. The herbicidal composition according to any one of schemes 17-30, wherein the composition is synergistic.

32. The herbicidal composition according to any one of schemes 17-31, wherein the active ingredients of the composition consist of pyroxasulfone, chlorotoluron and mesosulfuron-methyl.

33. A method for controlling undesirable vegetation, which includes applying an herbicidally effective amount of the herbicide mixture according to any one of schemes 1-16 or the herbicidal composition according to any one of schemes 17-32 to the undesirable vegetation or its location.

34. The method according to scheme 33, wherein the undesirable vegetation is controlled in wheat. The method according to scheme 33 or 34, wherein the undesirable vegetation is selected from the group consisting of: *Aegilops tauschil* and *Lolium multiflorum* Lamk.

35. A kit comprising the herbicide mixture according to any one of schemes 1-16 or the herbicidal composition according to any one of schemes 17-32.

SPECIFIC EMBODIMENTS

Before elaborating the present disclosure in detail, it may be helpful to provide definitions of some terms used herein.

Unless otherwise specified, all technical and scientific terms used herein have the same meaning as commonly understood by those of ordinary skill in the art to which the present disclosure belongs.

As used herein, the phrase "agricultural carrier" refers to a carrier known in the art and accepted for forming a variety of formulations for agricultural or horticultural application.

As used herein, the term "plant" or "crop" includes referring to whole plants, plant organs (e.g., leaves, stems, branches, roots, trunks, wickers, twigs, fruits, etc.), plant cells or plant seeds. This term also includes plant crops such as fruits. In another embodiment, the term "plant" or "vegetation" may include the propagation materials of the plant, and the propagation materials may include all reproductive parts of the plant, e.g., seeds and vegetative plant materials, such as cuttings and various tubers that may be used for plant propagation. The plants include: seed, tuber, spore, carmus, bulb, rhizome, sprout, stolon, bud and other parts of plants including: seedling and young plant which are transplanted after germinating or sprouting from the soil.

As used herein, the term "location" includes not only places where undesirable vegetation (e.g., weeds) may have grown, but also places where undesirable vegetation (e.g., weeds) has not yet appeared, and the cultivation areas.

As used herein, the term "after sprouting" refers to the application of an herbicide mixture or herbicidal composition to undesirable vegetation (e.g., weeds) sprouting from the soil, and the term "before sprouting" refers to the application of an herbicide mixture or herbicidal composition to the location, weeds, or soil before the undesirable vegetation (e.g., weeds) sprouting from the soil.

As used herein, the term "controlling undesirable vegetation" refers to disturbing the normal growth and development of undesirable vegetation. Various examples of controlling activities include, but are not limited to: inhibiting root growth, inhibiting sprout growth, inhibiting sprouting, inhibiting seed production, or reducing the biomass of weeds.

As used herein, the term "effective amount" means that the amount of the compound is sufficient to achieve a good level of control when it is ingested, contacted, or perceived. As used herein, the term "herbicidally effective amount" refers to the amount of active ingredient that produces herbicidal effect.

As used herein, the term "synergistic" means the combined effect of the active ingredients is greater than the sum of the effects of each individual ingredient. The term "synergistically effective amount" is an amount exhibiting an herbicidal activity greater than the sum of the herbicidal activities of the individual components.

As used herein, the term "mixture" or "composition" refers to, but is not limited to: any combination of physical forms, e.g., blends, solutions, or alloys.

As used herein, the term "ha" refers to hectares.

The term "surfactant" as used herein refers to an agriculturally acceptable material providing emulsification, stability, spreading, wetting, dispersibility, or other surface modification properties.

Unless otherwise indicated, the singular forms "a" and "an" as used herein include both the singular and the plural forms. Therefore, the terms "a", "an" or "at least one" may be used interchangeably in the present disclosure.

Throughout the application, the description of various embodiments uses the term "include (or comprise)"; however, those skilled in the art will understand that in some specific cases, the language "substantively consists of" or "consists of" may be used interchangeably to describe embodiments. The term "consisting of" means that the mixture or composition before the term comprises only the components listed after the term and no longer comprises other components, but may comprise impurities, and the impurities are only allowed to exist in a usual amount.

In order to better understand the teachings of the present disclosure, and in no way limiting the scope of the teachings, unless otherwise specified, all the numerical values, percentages or ratios, reaction conditions, and other numerical values used in the specification and schemes will be understood as being modified by the term "about" in all cases. Therefore, unless there is an indication to the contrary, the numerical parameters proposed in the following description and solutions are approximate values, and may be changed depending on the desired properties to be obtained. At the very least, each numerical parameter should be interpreted at least based on the value of the reported significant figures and by applying the usual rounding technique. In this regard, the use of the term "about" as used herein specifically comprises a range value of ±10% of the specified value. In addition, all ranges related to the same composition or characteristic of the present disclosure formed by end points (including the end points, and also including all intermediate points and ranges), may be independently combined.

Herbicide Mixture

The present disclosure provides an herbicide mixture comprising pyroxasulfone, chlorotoluron, and mesosulfuron-methyl. It is found that, compared to the weed control expected to be observed on the basis of multiple individual herbicides, the herbicide mixture may provide a greater spectrum of weed control, or reduce the dosage of individual herbicide; and a synergistic weeding effect is obtained even in some embodiments.

In one embodiment of the present disclosure, in the herbicide mixture, pyroxasulfone, chlorotoluron and mesosulfuron-methyl are present in synergistic herbicidally effective amounts.

In one embodiment of the present disclosure, in the herbicide mixture, the weight ratio of pyroxasulfone, chlorotoluron and mesosulfuron-methyl is (1-80):(12-1000):1. In one embodiment of the present disclosure, in the herbicide mixture, the weight ratio of pyroxasulfone, chlorotoluron and mesosulfuron-methyl is (1-80):(25-500):1. In one embodiment of the present disclosure, in the herbicide mixture, the weight ratio of pyroxasulfone, chlorotoluron and mesosulfuron-methyl is (2-40):(12-1000):1. In one embodiment of the present disclosure, in the herbicide mixture, the weight ratio of pyroxasulfone, chlorotoluron and mesosulfuron-methyl is (2-40):(25-500):1. In one embodiment of the present disclosure, in the herbicide mixture, the weight ratio of pyroxasulfone, chlorotoluron and mesosulfuron-methyl is (2.25-36):(28.125-450):1. In one embodiment of the present disclosure, in the herbicide mixture, the weight ratio of pyroxasulfone, chlorotoluron and mesosulfuron-methyl is (4-20):(25-500):1. In one embodiment of the present disclosure, in the herbicide mixture, the weight ratio of pyroxasulfone, chlorotoluron and mesosulfuron-methyl is (2-40):(50-250):1. In one embodiment of the present disclosure, in the herbicide mixture, the weight ratio of pyroxasulfone, chlorotoluron and mesosulfuron-methyl is (4-20):(50-250):1. In one embodiment of the present disclosure, in the herbicide mixture, the weight ratio of pyroxasulfone, chlorotoluron and mesosulfuron-methyl is (4.5-18):(56.25-225):1. In one embodiment of the present disclosure, in the herbicide mixture, the weight ratio of pyroxasulfone, chlorotoluron and mesosulfuron-methyl is (4-20):(110-250):1. In one embodiment of the present disclosure, in the herbicide mixture, the weight ratio of pyroxasulfone, chlorotoluron and mesosulfuron-methyl is (4.5-18):(110-225):1. In one embodiment of the present disclosure, in the herbicide mixture, the weight ratio of pyroxasulfone, chlorotoluron and mesosulfuron-methyl is (8-20):(110-225):1. In one embodiment of the present disclosure, in the herbicide mixture, the weight ratio of pyroxasulfone, chlorotoluron and mesosulfuron-methyl is (9-18):(110-225):1. In one embodiment of the present disclosure, in the herbicide mixture, the weight ratio of pyroxasulfone, chlorotoluron and mesosulfuron-methyl is (4-10):(110-250):1. In one embodiment of the present disclosure, in the herbicide mixture, the weight ratio of pyroxasulfone, chlorotoluron and mesosulfuron-methyl is (4.5-9):(110-225):1. In one embodiment of the present disclosure, in the herbicide mixture, the weight ratio of pyroxasulfone, chlorotoluron and mesosulfuron-methyl is (4-20):(50-120):1. In one embodiment of the present disclosure, in the herbicide mixture, the weight ratio of pyroxasulfone, chlorotoluron and mesosulfuron-methyl is (4.5-18):(50-120):1. In one embodiment of the present disclosure, in the herbicide mixture, the weight ratio of pyroxasulfone, chlorotoluron and mesosulfuron-methyl is (8-20):(50-120):1. In one embodiment of the present disclosure, in the herbicide mixture, the weight ratio of pyroxasulfone, chlorotoluron and mesosulfuron-methyl is (9-18):(50-120):1. In one embodiment of the present disclosure, in the herbicide mixture, the weight ratio of pyroxasulfone, chlorotoluron and mesosulfuron-methyl is (4-10):(50-120):1. In one embodiment of the present disclosure, in the herbicide mixture, the weight ratio of pyroxasulfone, chlorotoluron and mesosulfuron-methyl is (4.5-9):(50-120):1. In one embodiment of the present disclosure, in the herbicide mixture, the weight ratio of pyroxasulfone, chlorotoluron and mesosulfuron-methyl is (4.5-9):(56.25-112.5):1. In one embodiment of the present disclosure, in the herbicide mixture, the weight ratio of pyroxasulfone, chlorotoluron and mesosulfuron-methyl is (8-10):(100-120):1. In one embodiment of the present disclosure, in the herbicide mixture, the weight ratio of pyroxasulfone, chlorotoluron and mesosulfuron-methyl is 9:112.5:1. In the above embodiments of the present disclosure, in the herbicide mixture, while satisfying the conditions defined by the weight ratio of pyroxasulfone, chlorotoluron and mesosulfuron-methyl, the amount of pyroxasulfone may be less than that of chlorotoluron; i.e., the weight ratio of pyroxasulfone to that of chlorotoluron is less than 1, particularly less than 2, less than 3, less than 4, less than 5, less than 6, less than 7, less than 8, less than 9; and more particularly less than 10.

In one embodiment of the present disclosure, in the herbicide mixture, the weight ratio of pyroxasulfone, chlorotoluron and mesosulfuron-methyl is (20-360):(250-4500):(5-20). When the weight ratio of pyroxasulfone, chlorotoluron and mesosulfuron-methyl is (20-360):(250-4500):(5-20), in the relative amount range of (20-360) for pyroxasulfone, the relative amount of pyroxasulfone may be 20, 22.5, 25, 30, 35, 40, 45, 50, 55, 60, 65, 70, 75, 80, 85, 90, 100, 110, 120, 130, 140, 150, 160, 170, 180, 190, 200, 210, 220, 230, 240, 250, 260, 270, 280, 290, 300, 310, 320, 330, 340, 350, 360; and any relative amount range formed by any two of the above mentioned relative amounts as two ends, such as (25-360), (30-300), (40-250), (40-200), (80-200), (90-180), or (45-180), etc. When the weight ratio of pyroxasulfone, chlorotoluron and mesosulfuron-methyl is (20-360):(250-4500):(5-20), in the relative amount range of (250-4500) for chlorotoluron, the relative amount of chlorotoluron may be 250, 275, 300, 325, 350, 375, 400, 425, 450, 475, 500, 525, 550, 560, 562, 562.5, 600, 650, 700, 750, 800, 850, 900, 950, 1000, 1050, 1100, 1125, 1200, 1300, 1400, 1500, 1600, 1700, 1800, 1900, 2000, 2100, 2150, 2200, 2250, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500; and any relative amount range formed by any two of the above mentioned relative amounts as two ends, such as (300-4500), (300-4000), (250-3500), (300-3000), (400-2500), (400-1200), (500-2500), (500-2250), (560-2250), or (560-1125), etc. When the weight ratio of pyroxasulfone, chlorotoluron and mesosulfuron-methyl is (20-360):(250-4500):(5-20), in the relative amount range of (5-20) for mesosulfuron-methyl, the relative amount of mesosulfuron-methyl may be 5, 6, 7, 8, 9, 10, 11, 12, 13, 14, 15, 16, 17, 18, 19, 20; and any relative amount range formed by any two of the above mentioned relative amounts as two ends, such as (6-19), (7-18), (8-17), or (5, or 10-15, or 20), etc.; wherein (5, or 10-15, or 20) means (5-20), (5-15), (10-20), and (10-15). For example, the weight ratio of pyroxasulfone, chlorotoluron and mesosulfuron-methyl may be (25-360):(250-4500):(5, or 10-15, or 20); (25-300):(250-4500):(5, or 10-15, or 20); (30-300):(250-4500):(5, or 10-15, or 20); (35-300):(250-4500):(5, or 10-15, or 20); (40-300):(250-4500):(5, or 10-15, or 20); (40-250):(250-4500):(5, or 10-15, or 20); (40-200):(250-4500):(5, or 10-15, or 20); (40-200):(300-4500):(5, or 10-15, or 20); (40-200):(300-4000):(5, or 10-15, or 20); (40-200):(400-4000):(5, or 10-15, or 20); (40-200):(500-4000):(5, or 10-15, or 20); (40-200):(500-3500):(5, or 10-15, or 20); (40-200):(500-3000):(5, or 10-15, or 20); (40-200):(500-2500):(5, or 10-15, or 20); or (45-180):(560-2250):(5, or 10-15, or 20), etc.; wherein (5, or 10-15, or 20) means (5-20), (5-15), (10-20), and (10-15).

In one embodiment of the present disclosure, in the herbicide mixture, the weight ratio of pyroxasulfone, chlorotoluron and mesosulfuron-methyl is (40-200):(300-1500):(5-20). When the weight ratio of pyroxasulfone, chlorotoluron and mesosulfuron-methyl is (40-200):(300-1500):(5-20), in the relative amount range of (40-200) for pyroxasulfone, the relative amount of pyroxasulfone may be 40, 45, 50, 55, 60, 65, 70, 75, 80, 85, 90, 100, 110, 120, 130, 140, 150, 160, 170, 180, 190, 200; and any relative amount range formed by any two of the above mentioned relative amounts as two ends, such as (45-200), (80-200), (60-200), (50-190), (45-180), (60-180), or (90-180), etc. When the weight ratio of pyroxasulfone, chlorotoluron and mesosulfuron-methyl is (40-200):(300-1500):(5-20), in the relative amount range of (300-1500) for chlorotoluron, the relative amount of chlorotoluron may be any relative amount or range from 300 to 1500. For example, the relative amount of chlorotoluron may be 300, 325, 350, 375, 400, 425, 450, 475, 500, 525, 550, 560, 562.5, 600, 650, 700, 750, 800, 850, 900, 950, 1000, 1050, 1100, 1125, 1200, 1250, 1300, 1350, 1400, 1450, 1500; and any relative amount range formed by any two of the above mentioned relative amounts as two ends, such as (300-1400), (400-1200), (500-1200), (600-1400), (300-1300), (500-1400), (500-1200), (550-1130), or (560-1125), etc. When the weight ratio of pyroxasulfone, chlorotoluron and mesosulfuron-methyl is (40-200):(300-1500):(5-20), in the relative amount range of (5-20) for mesosulfuron-methyl, the relative amount of mesosulfuron-methyl may be any relative amount or range from 5 to 20, for example, the relative amount of mesosulfuron-methyl may be 5, 6, 7, 8, 9, 10, 11, 12, 13, 14, 15, 16, 17, 18, 19, 20; and any relative amount range formed by any two of the above mentioned relative amounts as two ends, such as (6-19), (7-18), or (8-17), or (5, or 10-15, or 20), etc.; wherein (5, or 10-15, or 20) means (5-20), (5-15), (10-20), and (10-15). For example, the weight ratio of pyroxasulfone, chlorotoluron and mesosulfuron-methyl may be (40-200):(300-1500):(5, or 10-15, or 20); (50-200):(300-1500):(5, or 10-15, or 20); (60-200):(300-1500):(5, or 10-15, or 20); (70-200):(300-1500):(5, or 10-15, or 20); (80-200):(300-1500):(5, or 10-15, or 20); (90-200):(300-1500):(5, or 10-15, or 20); (90-180):(300-1500):(5, or 10-15, or 20); (40-200):(300-1400):(5, or 10-15, or 20); (40-200):(400-1400):(5, or 10-15, or 20); (40-200):(450-1300):(5, or 10-15, or 20); (40-200):(500-1200):(5, or 10-15, or 20); (80-200):(500-1200):(5, or 10-15, or 20); (80-200):(500-1200):(5, or 10-15, or 20); or (90-180):(560-1125):(5, or 10-15, or 20); wherein (5, or 10-15, or 20) means (5-20), (5-15), (10-20), and (10-15).

In one embodiment of the present disclosure, in the herbicide mixture, the weight ratio of pyroxasulfone, chlorotoluron and mesosulfuron-methyl is (3.5-5.5):(20-40):1; (7-11):(100-120):1; (26-46):(215-235):1; (4-5):(25-35):1; (8-10):(105-115):1; or (30-40):(220-230):1. In a preferred embodiment of the present disclosure, in the herbicide mixture, the weight ratio of pyroxasulfone, chlorotoluron and mesosulfuron-methyl is 4.5:28.125:1; 9:112.5:1; or 36:225:1.

In one embodiment of the present disclosure, pyroxasulfone, chlorotoluron and mesosulfuron-methyl are applied in combination or sequentially. In one example, pyroxasulfone, chlorotoluron and mesosulfuron-methyl are separately prepared, and each of them is applied as it is, or diluted to a predetermined concentration for application. In another example, pyroxasulfone, chlorotoluron and mesosulfuron-methyl are separately prepared, and when being diluted to a predetermined concentration, they are mixed and then applied. In another example, pyroxasulfone, chlorotoluron and mesosulfuron-methyl are formulated together, and then applied as it is, or diluted to a predetermined concentration for application.

The herbicidally effective application rate of the herbicide mixture generally varies with various conditions, e.g., the type of formulation, weather conditions, type of crops, and type of weeds. In one embodiment of the present disclosure, the application rate of the herbicide mixture may be 77.1875-2450 grams of active ingredient per hectare (g ai/ha). In the range of 77.1875-2450 g ai/ha, the application rate of the herbicide mixture may be 77.1875 g ai/ha, 90 g ai/ha, 100 g ai/ha, 120 g ai/ha, 140 g ai/ha, 150 g ai/ha, 153.125 g ai/ha, 200 g ai/ha, 300 g ai/ha, 306.25 g ai/ha, 400 g ai/ha, 500 g ai/ha, 600 g ai/ha, 612.5 g ai/ha, 617.5 g ai/ha, 627.5 g ai/ha, 657.5 g ai/ha, 662.5 g ai/ha, 672.5 g ai/ha, 700 g ai/ha, 747.5 g ai/ha, 752.5 g ai/ha, 762.5 g ai/ha, 800 g ai/ha, 900 g ai/ha, 1000 g ai/ha, 1100 g ai/ha, 1175 g ai/ha, 1180 g ai/ha, 1190 g ai/ha, 1200 g ai/ha, 1220 g ai/ha, 1225 g ai/ha, 1235 g ai/ha, 1300 g ai/ha, 1310 g ai/ha, 1315 g ai/ha, 1325 g ai/ha, 1400 g ai/ha, 1500 g ai/ha, 1600 g ai/ha, 1700 g ai/ha, 1800 g ai/ha, 1900 g ai/ha, 2000 g ai/ha, 2100 g ai/ha, 2200 g ai/ha, 2300 g ai/ha, 2305 g ai/ha, 2315 g ai/ha, 2345 g ai/ha, 2350 g ai/ha, 2360 g ai/ha, 2400 g ai/ha, 2435 g ai/ha, 2440 g ai/ha, 2450 g ai/ha; and any application rate range formed by any two of the above mentioned application rates as two ends. An application rate of the above herbicide mixture is based on the total application rate of all active ingredients.

The herbicidally effective application rate of each active ingredient of the herbicide mixture generally varies with various conditions, e.g., the type of formulation, weather conditions, type of crops, and type of weeds. In one embodiment of the present disclosure, the application rate of pyroxasulfone is 5.625-180 g ai/ha, the application rate of chlorotoluron is 70.3125-2250 g ai/ha, and the application rate of mesosulfuron-methyl is 1.25-20 g ai/ha. In the range of 5.625-180 g ai/ha, the application rate of pyroxasulfone may be 5.625 g ai/ha, 8 g ai/ha, 10 g ai/ha, 11 g ai/ha, 11.25 g ai/ha, 15 g ai/ha, 20 g ai/ha, 22.5 g ai/ha, 30 g ai/ha, 45 g ai/ha, 60 g ai/ha, 75 g ai/ha, 90 g ai/ha, 100 g ai/ha, 110 g ai/ha, 120 g ai/ha, 130 g ai/ha, 140 g ai/ha, 150 g ai/ha, 160 g ai/ha, 170 g ai/ha, 180 g ai/ha; and any application rate range formed by any two of the above mentioned application rates as two ends. In the range of 70.3125-2250 g ai/ha, the application rate of chlorotoluron may be 70.3125 g ai/ha, 90 g ai/ha, 100 g ai/ha, 120 g ai/ha, 140 g ai/ha, 140.625 g ai/ha, 160 g ai/ha, 180 g ai/ha, 200 g ai/ha, 220 g ai/ha, 240 g ai/ha, 260 g ai/ha, 280 g ai/ha, 281.25 g ai/ha, 300 g ai/ha, 350 g ai/ha, 400 g ai/ha, 450 g ai/ha, 500 g ai/ha, 550 g ai/ha, 562.5 g ai/ha, 600 g ai/ha, 650 g ai/ha, 700 g ai/ha, 750 g ai/ha, 800 g ai/ha, 850 g ai/ha, 900 g ai/ha, 950 g ai/ha, 1000 g ai/ha, 1050 g ai/ha, 1100 g ai/ha, 1125 g ai/ha, 1150 g ai/ha, 1200 g ai/ha, 1300 g ai/ha, 1400 g ai/ha, 1500 g ai/ha, 1600 g ai/ha, 1700 g ai/ha, 1800 g ai/ha, 1900 g ai/ha, 2000 g ai/ha, 2050 g ai/ha, 2100 g ai/ha, 2150 g ai/ha, 2200 g ai/ha, 2250 g ai/ha; and any application rate range formed by any two of the above mentioned application rates as two ends. In the range of 1.25-20 g ai/ha, the application rate of mesosulfuron-methyl may be 1.25 g ai/ha, 1.5 g ai/ha, 2 g ai/ha, 2.5 g ai/ha, 3 g ai/ha, 3.5 g ai/ha, 4 g ai/ha, 4.5 g ai/ha, 5 g ai/ha, 5.5 g ai/ha, 6 g ai/ha, 6.5 g ai/ha, 7 g ai/ha, 7.5 g ai/ha, 8 g ai/ha, 8.5 g ai/ha, 9 g ai/ha, 9.5 g ai/ha, 10 g ai/ha, 10.5 g ai/ha, 11 g ai/ha, 11.5 g ai/ha, 12 g ai/ha, 12.5 g ai/ha, 13 g ai/ha, 13.5 g ai/ha, 14 g ai/ha, 14.5 g ai/ha, 15 g ai/ha, 15.5 g ai/ha, 16 g ai/ha, 16.5 g ai/ha, 17 g ai/ha, 17.5 g ai/ha, 18 g ai/ha, 18.5 g ai/ha, 19 g ai/ha, 19.5 g ai/ha, 20 g ai/ha; and any application rate range formed by any two of the above mentioned application rates as two ends. In the above embodiments of the present disclosure, in the herbicide mixture, while satisfying the limitation conditions for the herbicidally effective application rate of each active ingredient of the herbicide mixture, the application rate of pyroxasulfone may be lower than that of chlorotoluron, i.e., the application rate of pyroxasulfone to that of chlorotoluron is less than 1, particularly less than 2, less than 3, less than 4, less than 5, less than 6, less than 7, less than 8, less than 9, more particularly less than 10.

In some embodiments of the present disclosure, the herbicide mixture is synergistic, i.e., the herbicidal active ingredients are more effective when they are applied in combination than when they are applied separately. Synergy may be defined as "the interaction of two or more factors makes the effect of the combination greater than the expected effect based on the response to the individual factor applied separately" (Shaner, D. L., Ed. Herbicide Handbook, 10th ed. Lawrence: Weed Society of America, 2014). In some embodiments, the herbicide mixture exhibits a synergistic effect as determined by Colby equation (Colby, S. R. Calculation of the synergistic and antagonistic response of herbicide combinations. Weeds 1967, 15, 20-22). The calculation of the synergistisc effect through the Colby equation is described in detail in the Example section of the present disclosure.

In one embodiment of the present disclosure, the herbicide mixture may comprise other active ingredients, such as other herbicides, insecticides, fungicides, bactericides, nematicides, molluscicides, growth regulators, biological agents, fertilizers, safeners, or mixtures thereof. However, for the avoidance of doubt, it should be understood that such other active ingredients are not necessary for the herbicide mixture of the present invention to achieve the desired control of undesirable vegetation. In a further embodiment of the present disclosure, the premise of the presence of other active ingredients is not affecting the synergistic effect of the herbicide mixture.

In one embodiment of the present disclosure, the herbicide mixture does not comprise ingredients other than active ingredients, such as agricultural carriers.

In one embodiment of the present disclosure, the herbicide mixture substantively consists of pyroxasulfone, chlorotoluron and mesosulfuron-methyl.

In one embodiment of the present disclosure, the herbicide mixture consists of pyroxasulfone, chlorotoluron and mesosulfuron-methyl.

The herbicide mixture may be applied before sprouting, after sprouting, or a combination thereof.

Herbicidal Composition

The present disclosure provides an herbicidal composition comprising pyroxasulfone, chlorotoluron, mesosulfuron-methyl, and at least one agricultural carrier. It is found that, compared to the weed control expected to be observed on the basis of multiple individual herbicides, the herbicidal composition may provide a greater spectrum of weed control, or reduce the dosage of individual herbicide; and a synergistic weeding effect is obtained even in some embodiments.

In one embodiment of the present disclosure, in the herbicidal composition, pyroxasulfone, chlorotoluron and mesosulfuron-methyl are present in synergistic herbicidally effective amounts.

In one embodiment of the present disclosure, the herbicidal composition further comprises a surfactant.

In one embodiment of the present disclosure, in the herbicidal composition, the weight ratio of pyroxasulfone, chlorotoluron and mesosulfuron-methyl is (1-80):(12-1000):1. In one embodiment of the present disclosure, in the herbicidal composition, the weight ratio of pyroxasulfone, chlorotoluron and mesosulfuron-methyl is (1-80):(25-500):1. In one embodiment of the present disclosure, in the herbicidal composition, the weight ratio of pyroxasulfone, chlorotoluron and mesosulfuron-methyl is (2-40):(12-1000):1. In one embodiment of the present disclosure, in the herbicidal composition, the weight ratio of pyroxasulfone, chlorotoluron and mesosulfuron-methyl is (2-40):(25-500):1. In one embodiment of the present disclosure, in the herbicidal composition, the weight ratio of pyroxasulfone, chlorotoluron and mesosulfuron-methyl is (2.25-36):(28 or 28.125-450):1. In one embodiment of the present disclosure, in the herbicidal composition, the weight ratio of pyroxasulfone, chlorotoluron and mesosulfuron-methyl is (4-20):(25-500):1. In one embodiment of the present disclosure, in the herbicidal composition, the weight ratio of pyroxasulfone, chlorotoluron and mesosulfuron-methyl is (2-40):(50-250):1. In one embodiment of the present disclosure, in the herbicidal composition, the weight ratio of pyroxasulfone, chlorotoluron and mesosulfuron-methyl is (4-20):(50-250):1. In one embodiment of the present disclosure, in the herbicidal composition, the weight ratio of pyroxasulfone, chlorotoluron and mesosulfuron-methyl is (4.5-18):(56.25-225):1. In one embodiment of the present disclosure, in the herbicidal composition, the weight ratio of pyroxasulfone, chlorotoluron and mesosulfuron-methyl is (4-20):(110-225):1. In one embodiment of the present disclosure, in the herbicidal composition, the weight ratio of pyroxasulfone, chlorotoluron and mesosulfuron-methyl is (4.5-18):(110-225):1. In one embodiment of the present disclosure, in the herbicidal composition, the weight ratio of pyroxasulfone, chlorotoluron and mesosulfuron-methyl is (8-20):(110-225):1. In one embodiment of the present disclosure, in the herbicidal composition, the weight ratio of pyroxasulfone, chlorotoluron and mesosulfuron-methyl is (9-18):(110-225):1. In one embodiment of the present disclosure, in the herbicidal composition, the weight ratio of pyroxasulfone, chlorotoluron and mesosulfuron-methyl is (4-10):(110-250):1. In one embodiment of the present disclosure, in the herbicidal composition, the weight ratio of pyroxasulfone, chlorotoluron and mesosulfuron-methyl is (4.5-9):(110-225):1. In one embodiment of the present disclosure, in the herbicidal composition, the weight ratio of pyroxasulfone, chlorotoluron and mesosulfuron-methyl is (4-20):(50-120):1. In one embodiment of the present disclosure, in the herbicidal composition, the weight ratio of pyroxasulfone, chlorotoluron and mesosulfuron-methyl is (4.5-18):(50-120):1. In one embodiment of the present disclosure, in the herbicidal composition, the weight ratio of pyroxasulfone, chlorotoluron and mesosulfuron-methyl is (8-20):(50-120):1. In one embodiment of the present disclosure, in the herbicidal composition, the weight ratio of pyroxasulfone, chlorotoluron and mesosulfuron-methyl is (9-18):(50-120):1. In one embodiment of the present disclosure, in the herbicidal composition, the weight ratio of pyroxasulfone, chlorotoluron and mesosulfuron-methyl is (4-10):(50-120):1. In one embodiment of the present disclosure, in the herbicidal composition, the weight ratio of pyroxasulfone, chlorotoluron and mesosulfuron-methyl is (4.5-9):(50-120):1. In one embodiment of the present disclosure, in the herbicidal composition, the weight ratio of pyroxasulfone, chlorotoluron and mesosulfuron-methyl is (4.5-9):(56.25-112.5):1. In one embodiment of the present disclosure, in the herbicidal composition, the weight ratio of pyroxasulfone, chlorotoluron and mesosulfuron-methyl is (8-10):(100-120):1. In one embodiment of the present disclosure, in the herbicidal composition, the weight ratio of pyroxasulfone, chlorotoluron and mesosulfuron-methyl is 9:112.5:1. In the above embodiments of the present disclosure, in the herbicide mixture, while satisfying the conditions defined by the weight ratio of pyroxasulfone, chlorotoluron and mesosulfuron-methyl, the amount of pyroxasulfone may be less than that of chlorotoluron; i.e., the weight ratio of pyroxasulfone to that of chlorotoluron is less than 1, particularly less than 2, less than 3, less than 4, less than 5, less than 6, less than 7, less than 8, less than 9, more particularly less than 10.

In one embodiment of the present disclosure, in the herbicidal composition, the weight ratio of pyroxasulfone, chlorotoluron and mesosulfuron-methyl is (20-360):(250-4500):(5-20). When the weight ratio of pyroxasulfone, chlorotoluron and mesosulfuron-methyl is (20-360):(250-4500):(5-20), in the relative amount range of (20-360) for pyroxasulfone, the relative amount of pyroxasulfone may be 20, 22.5, 25, 30, 35, 40, 45, 50, 55, 60, 65, 70, 75, 80, 85, 90, 100, 110, 120, 130, 140, 150, 160, 170, 180, 190, 200, 210, 220, 230, 240, 250, 260, 270, 280, 290, 300, 310, 320, 330, 340, 350, 360; and any relative amount range formed by any two of the above mentioned relative amounts as two ends, such as (25-360), (30-300), (40-250), (40-200), (80-200), (90-180), or (45-180), etc. When the weight ratio of pyroxasulfone, chlorotoluron and mesosulfuron-methyl is (20-360):(250-4500):(5-20), in the relative amount range of (250-4500) for chlorotoluron, the relative amount of chlorotoluron may be 250, 275, 300, 325, 350, 375, 400, 425, 450, 475, 500, 525, 550, 560, 562, 562.5, 600, 650, 700, 750, 800, 850, 900, 950, 1000, 1050, 1100, 1125, 1200, 1300, 1400, 1500, 1600, 1700, 1800, 1900, 2000, 2100, 2150, 2200, 2250, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500; and any relative amount range formed by any two of the above mentioned relative amounts as two ends, such as (300-4500), (300-4000), (250-3500), (300-3000), (400-2500), (400-1200), (500-2500), (500-2250), (560-2250), or (560-1125), etc. When the weight ratio of pyroxasulfone, chlorotoluron and mesosulfuron-methyl is (20-360):(250-4500):(5-20), in the relative amount range of (5-20) for mesosulfuron-methyl, the relative amount of mesosulfuron-methyl may be 5, 6, 7, 8, 9, 10, 11, 12, 13, 14, 15, 16, 17, 18, 19, 20; and any relative amount range formed by any two of the above mentioned relative amounts as two ends, such as (6-19), (7-18), (8-17), or (5, or 10-15, or 20), etc.; wherein (5, or 10-15, or 20) means (5-20), (5-15), (10-20), and (10-15). For example, the weight ratio of pyroxasulfone, chlorotoluron and mesosulfuron-methyl may be (25-360):(250-4500):(5, or 10-15, or 20); (25-300):(250-4500):(5, or 10-15, or 20); (30-300):(250-4500):(5, or 10-15, or 20); (35-300):(250-4500):(5, or 10-15, or 20); (40-300):(250-4500):(5, or 10-15, or 20); (40-250):(250-4500):(5, or 10-15, or 20); (40-200):(250-4500):(5, or 10-15, or 20); (40-200):(300-4500):(5, or 10-15, or 20); (40-200):(300-4000):(5, or 10-15, or 20); (40-200):(400-4000):(5, or 10-15, or 20); (40-200):(500-4000):(5, or 10-15, or 20); (40-200):(500-3500):(5, or 10-15, or 20); (40-200):(500-3000):(5, or 10-15, or 20); (40-200):(500-2500):(5, or 10-15, or 20); or (45-180):(560-2250):(5, or 10-15, or 20), etc.; wherein (5, or 10-15, or 20) means (5-20), (5-15), (10-20), and (10-15).

In one embodiment of the present disclosure, in the herbicidal composition, the weight ratio of pyroxasulfone, chlorotoluron and mesosulfuron-methyl is (40-200):(300-1500):(5-20). When the weight ratio of pyroxasulfone, chlorotoluron and mesosulfuron-methyl is (40-200):(300-1500):(5-20), in the relative amount range of (40-200) for pyroxasulfone, the relative amount of pyroxasulfone may be 40, 45, 50, 55, 60, 65, 70, 75, 80, 85, 90, 100, 110, 120, 130, 140, 150, 160, 170, 180, 190, 200; and any relative amount range formed by any two of the above mentioned relative amounts as two ends, such as (45-200), (80-200), (60-200), (50-190), (45-180), (60-180), or (90-180), etc. When the weight ratio of pyroxasulfone, chlorotoluron and mesosulfuron-methyl is (40-200):(300-1500):(5-20), in the relative amount range of (300-1500) for chlorotoluron, the relative amount of chlorotoluron may be any relative amount or range from 300 to 1500. For example, the relative amount of chlorotoluron may be 300, 325, 350, 375, 400, 425, 450, 475, 500, 525, 550, 560, 562.5, 600, 650, 700, 750, 800, 850, 900, 950, 1000, 1050, 1100, 1125, 1200, 1250, 1300, 1350, 1400, 1450, 1500; and any relative amount range formed by any two of the above mentioned relative amounts as two ends, such as (300-1400), (400-1200), (500-1200), (600-1400), (300-1300), (500-1400), (500-1200), (550-1130), or (560-1125), etc. When the weight ratio of pyroxasulfone, chlorotoluron and mesosulfuron-methyl is (40-200):(300-1500):(5-20), in the relative amount range of (5-20) for mesosulfuron-methyl, the relative amount of mesosulfuron-methyl may be any relative amount or range from 5 to 20, for example, the relative amount of mesosulfuron-methyl may be 5, 6, 7, 8, 9, 10, 11, 12, 13, 14, 15, 16, 17, 18, 19, 20; and any relative amount range formed by any two of the above mentioned relative amounts as two ends, such as (6-19), (7-18), or (8-17), or (5, or 10-15, or 20), etc.; wherein (5, or 10-15, or 20) means (5-20), (5-15), (10-20), and (10-15). For example, the weight ratio of pyroxasulfone, chlorotoluron and mesosulfuron-methyl may be (40-200):(300-1500):(5, or 10-15, or 20); (50-200):(300-1500):(5, or 10-15, or 20); (60-200):(300-1500):(5, or 10-15, or 20); (70-200):(300-1500):(5, or 10-15, or 20); (80-200):(300-1500):(5, or 10-15, or 20); (90-200):(300-1500):(5, or 10-15, or 20); (90-180):(300-1500):(5, or 10-15, or 20); (40-200):(300-1400):(5, or 10-15, or 20); (40-200):(400-1400):(5, or 10-15, or 20); (40-200):(450-1300):(5, or 10-15, or 20); (40-200):(500-1200):(5, or 10-15, or 20); (80-200):(500-1200):(5, or 10-15, or 20); (80-200):(500-1200):(5, or 10-15, or 20); or (90-180):(560-1125):(5, or 10-15, or 20); wherein (5, or 10-15, or 20) means (5-20), (5-15), (10-20), and (10-15).

In one embodiment of the present disclosure, in the herbicidal composition, the weight ratio of pyroxasulfone, chlorotoluron and mesosulfuron-methyl is (3.5-5.5):(20-40):1; (7-11):(100-120):1; (26-46):(215-235):1; (4-5):(25-35):1; (8-10):(105-115):1; or (30-40):(220-230):1. In a preferred embodiment of the present disclosure, in the herbicidal composition, the weight ratio of pyroxasulfone, chlorotoluron and mesosulfuron-methyl is 4.5:28.125:1; 9:112.5:1; or 36:225:1.

In one embodiment of the present disclosure, pyroxasulfone, chlorotoluron and mesosulfuron-methyl are applied in combination or sequentially. In one example, pyroxasulfone, chlorotoluron and mesosulfuron-methyl are separately prepared, and each of them is applied as it is, or diluted to a predetermined concentration for application. In another example, pyroxasulfone, chlorotoluron and mesosulfuron-methyl are separately prepared, and when being diluted to a predetermined concentration, they are mixed and then applied. In another example, pyroxasulfone, chlorotoluron and mesosulfuron-methyl are formulated together, and then applied as it is, or diluted to a predetermined concentration for application.

The herbicidally effective application rate of the herbicidal composition generally varies with various conditions, e.g., the type of the formulation, the weather conditions, the type of crops, and the type of weeds. In one embodiment of the present disclosure, the application rate of the herbicidal composition may be 77.1875-2450 grams of active ingredient per hectare (g ai/ha). In the range of 77.1875-2450 g ai/ha, the application rate of the herbicidal composition may be 77.1875 g ai/ha, 90 g ai/ha, 100 g ai/ha, 120 g ai/ha, 140 g ai/ha, 150 g ai/ha, 153.125 g ai/ha, 200 g ai/ha, 300 g ai/ha, 306.25 g ai/ha, 400 g ai/ha, 500 g ai/ha, 600 g ai/ha, 612.5 g ai/ha, 617.5 g ai/ha, 627.5 g ai/ha, 657.5 g ai/ha, 662.5 g ai/ha, 672.5 g ai/ha, 700 g ai/ha, 747.5 g ai/ha, 752.5 g ai/ha, 762.5 g ai/ha, 800 g ai/ha, 900 g ai/ha, 1000 g ai/ha, 1100 g ai/ha, 1175 g ai/ha, 1180 g ai/ha, 1190 g ai/ha, 1200 g ai/ha, 1220 g ai/ha, 1225 g ai/ha, 1235 g ai/ha, 1300 g ai/ha, 1310 g ai/ha, 1315 g ai/ha, 1325 g ai/ha, 1400 g ai/ha, 1500 g ai/ha, 1600 g ai/ha, 1700 g ai/ha, 1800 g ai/ha, 1900 g ai/ha, 2000 g ai/ha, 2100 g ai/ha, 2200 g ai/ha, 2300 g ai/ha, 2305 g ai/ha, 2315 g ai/ha, 2345 g ai/ha, 2350 g ai/ha, 2360 g ai/ha, 2400 g ai/ha, 2435 g ai/ha, 2440 g ai/ha, 2450 g ai/ha; and any application rate range formed by any two of the above mentioned application rates as two ends. An application rate of the above herbicidal composition is based on the total application rate of all active ingredients.

The herbicidally effective application rate of each active ingredient of the herbicidal composition generally varies with various conditions, e.g., the type of formulation, weather conditions, type of crops, and type of weeds. In one embodiment of the present disclosure, the application rate of pyroxasulfone is 5.625-180 g ai/ha, the application rate of chlorotoluron is 70.3125-2250 g ai/ha, and the application rate of mesosulfuron-methyl is 1.25-20 g ai/ha. In the range of 5.625-180 g ai/ha, the application rate of pyroxasulfone may be 5.625 g ai/ha, 8 g ai/ha, 10 g ai/ha, 11 g ai/ha, 11.25 g ai/ha, 15 g ai/ha, 20 g ai/ha, 22.5 g ai/ha, 30 g ai/ha, 45 g ai/ha, 60 g ai/ha, 75 g ai/ha, 90 g ai/ha, 100 g ai/ha, 110 g ai/ha, 120 g ai/ha, 130 g ai/ha, 140 g ai/ha, 150 g ai/ha, 160 g ai/ha, 170 g ai/ha, 180 g ai/ha; and any application rate range formed by any two of the above mentioned application rates as two ends. In the range of 70.3125-2250 g ai/ha, the application rate of chlorotoluron may be 70.3125 g ai/ha, 90 g ai/ha, 100 g ai/ha, 120 g ai/ha, 140 g ai/ha, 140.625 g ai/ha, 160 g ai/ha, 180 g ai/ha, 200 g ai/ha, 220 g ai/ha, 240 g ai/ha, 260 g ai/ha, 280 g ai/ha, 281.25 g ai/ha, 300 g ai/ha, 350 g ai/ha, 400 g ai/ha, 450 g ai/ha, 500 g ai/ha, 550 g ai/ha, 562.5 g ai/ha, 600 g ai/ha, 650 g ai/ha, 700 g ai/ha, 750 g ai/ha, 800 g ai/ha, 850 g ai/ha, 900 g ai/ha, 950 g ai/ha, 1000 g ai/ha, 1050 g ai/ha, 1100 g ai/ha, 1125 g ai/ha, 1150 g ai/ha, 1200 g ai/ha, 1300 g ai/ha, 1400 g ai/ha, 1500 g ai/ha, 1600 g ai/ha, 1700 g ai/ha, 1800 g ai/ha, 1900 g ai/ha, 2000 g ai/ha, 2050 g ai/ha, 2100 g ai/ha, 2150 g ai/ha, 2200 g ai/ha, 2250 g ai/ha; and any application rate range formed by any two of the above mentioned application rates as two ends. In the range of 1.25-20 g ai/ha, the application rate of mesosulfuron-methyl may be 1.25 g ai/ha, 1.5 g ai/ha, 2 g ai/ha, 2.5 g ai/ha, 3 g ai/ha ha, 3.5 g ai/ha, 4 g ai/ha, 4.5 g ai/ha, 5 g ai/ha, 5.5 g ai/ha, 6 g ai/ha, 6.5 g ai/ha, 7 g ai/ha, 7.5 g ai/ha, 8 g ai/ha, 8.5 g ai/ha, 9 g ai/ha, 9.5 g ai/ha, 10 g ai/ha, 10.5 g ai/ha, 11 g ai/ha, 11.5 g ai/ha, 12 g ai/ha, 12.5 g ai/ha, 13 g ai/ha, 13.5 g ai/ha, 14 g ai/ha, 14.5 g ai/ha, 15 g ai/ha, 15.5 g ai/ha, 16 g ai/ha, 16.5 g ai/ha, 17 g ai/ha, 17.5 g ai/ha, 18 g ai/ha, 18.5 g ai/ha, 19 g ai/ha, 19.5 g ai/ha, 20 g ai/ha; and any application rate range formed by any two of the above mentioned application rates as two ends. In the above embodiments of the present disclosure, preferably, in the herbicidal composition, while satisfying the limitation conditions for the herbicidally effective application rate of each active ingredient of the above herbicidal composition, the application rate of pyroxasulfone needs to be lower than that of chlorotoluron, i.e., the application rate of pyroxasulfone to that of chlorotoluron is less than 1, particularly less than 2, less than 3, less than 4, less than 5, less than 6, less than 7, less than 8, less than 9, more particularly less than 10.

In some embodiments of the present disclosure, the herbicidal composition is synergistic, i.e., the herbicidal active ingredients are more effective when they are applied in combination than when they are applied separately. Synergy may be defined as "the interaction of two or more factors makes the effect of the combination greater than the expected effect based on the response to the individual factor applied separately" (Shaner, D. L., Ed. Herbicide Handbook, 10th ed. Lawrence: Weed Society of America, 2014). In some embodiments, the herbicidal composition exhibits a synergistic effect as determined by Colby equation (Colby, S. R. Calculation of the synergistic and antagonistic response of herbicide combinations. Weeds 1967, 15, 20-22). The calculation of the synergistic effect through the Colby equation is described in detail in the Example section of the present disclosure.

In one embodiment of the present disclosure, the herbicidal composition may comprise other active ingredients, such as other herbicides, insecticides, fungicides, bactericides, nematicides, molluscicides, growth regulators, biological agents, fertilizers, safeners or mixtures thereof. However, for the avoidance of doubt, it should be understood that such other active ingredients are not necessary for the herbicidal composition of the present invention to achieve the desired control of undesirable vegetation. In a further embodiment of the present disclosure, the premise of the presence of other active ingredients is not affecting the synergistic effect of the herbicidal composition.

In one embodiment of the present disclosure, the active ingredients of the herbicidal composition substantively consist of pyroxasulfone, chlorotoluron and mesosulfuron-methyl.

In one embodiment of the present disclosure, the active ingredients of the herbicidal composition consist of pyroxasulfone, chlorotoluron and mesosulfuron-methyl.

The agricultural carrier comprised in the herbicidal composition of the present disclosure may be a solid carrier, or a liquid carrier. Examples of suitable solid carriers include: mineral soils such as silica gel, silicate, talc, kaolin, activated clay (attaclay), limestone, lime, chalk, red basalt, loess, clay, dolomite, diatomite, calcium sulfate, magnesium sulfate, magnesium oxide, a mixture of ground materials of sodium carbonate and sodium bicarbonate, and sodium sulfate, ground synthetic materials; fertilizers such as ammonium sulfate, ammonium phosphate, ammonium nitrate, urea; and plant-derived products such as grain flour, bark powder, wood powder and nut shell powder, cellulose powder, and other solid carriers. Examples of suitable liquid carriers include: water, alcohols such as methanol, cyclohexanol and decanol, ethylene glycol and polypropylene glycol, N,N-dimethylformamide, dimethyl sulfoxide, N-alkylpyrrolidone, aromatic hydrocarbons such as alkylbenzene and alkylnaphthalene, paraffin, olive oil, castor oil, linseed oil, tung oil, sesame oil, corn oil, peanut oil, cottonseed oil, soybean oil, rapeseed oil and coconut oil, aliphatic esters, ketones such as cyclohexanone, 2-heptanone, isophorone, 4-hydroxy-4-methyl-2-pentanone, etc.

In one embodiment of the present disclosure, the herbicidal composition of the present disclosure further comprises a surfactant. Examples of suitable surfactants comprised in the herbicidal composition of the present disclosure include, but are not limited to: nonionic, anionic, cationic and amphoteric types, such as alkoxylated fatty alcohol, ethoxylated polysorbate (e.g. Tween 20), ethoxylated castor oil, lignin sulfonate, fatty acid sulfonate (e.g. dodecyl sulfonate), phosphate ester such as phosphate ester of alcohol alkoxylate, phosphate ester of alkylphenol alkoxylate and phosphate ester of styrylphenol ethoxylate, sulfonated naphthalene and condensate of naphthalene derivative and formaldehyde, condensate of naphthalene or naphthalenesulfonic acid with phenol and formaldehyde, alkylarylsulphonate, ethoxylated alkylphenol and arylphenol, polyalkylene glycol, sorbitol ester, alkali metal (for example, sodium) lignosulfonate, tristyrylphenol ethoxylated phosphate ester, aliphatic alcohol ethoxylate, alkylphenol ethoxylate, ethylene oxide/propylene oxide block copolymer, graft copolymer, and polyvinyl alcohol-vinyl acetate copolymer. Other surfactants known in the art may be used as needed.

The herbicidal composition of the present disclosure may also comprise other ingredients, such as wetting agent, defoamer, adhesive, neutralizer, thickener, binder, chelating agent, stabilizer, buffer, or antifreezing agent, so as to increase the stability, density and viscosity of the composition.

Without departing from the scope of the present disclosure, the herbicidal composition of the present disclosure may also be applied together with one or more other herbicides to control a wider variety of undesirable vegetation. When being used in combination with other herbicides, the composition may be formulated with the other herbicides, tan mixed with the other herbicides, or applied sequentially with the other herbicides. Some of the other herbicides that may be used with the herbicidal composition of the present disclosure include, but are not limited to: chlorophenoxyacetic acid (4-CPA), chlorophenoxybutyric acid (4-CPB), chlorophenoxypropyl acid (4-CPP), 2,4-D, 2,4-D choline salt, 2,4-D ester and 2,4-D amine, 2,4-DB, 3,4-DA, 3,4-DB, 2,4-DEB, 2,4-DEP, 3,4-DP, 2,3,6-TBA, 2,4,5-T, 2,4,5-TB, acetochlor, acifluorfen, aclonifen, acrolein, alachlor, allidochlor, alloxydim, allylalcohol, pentachloropentanonic acid (alorac), ametridione, ametryn, amibuzin, amicarbazone, amidosulfuron, aminocyclopyrachlor, aminopyralid, amiprofos-methyl, amitrole, ammoniumsulfamate, anilofos, anisuron, asulam, atraton, atrazine, azafenidin, azimsulfuron, aziprotryne, barban, isopropyl m-chlorophenylcarbamate (BCPC), beflubutamid, benazolin, bencarbazone, benfuresate, bensulfuron-methyl, bensulide, benthiocarb, bentazon-sodium, benzadox, benzfendizone, benzipram, benzobicyclon, benzfendizone, benzofenap, benzofluor, benzoylprop, benzthiazuron, bialaphos, bicyclopyrone, bifenox, bilanafos, bispyribac-sodium, borax, bromacil, bromobonil, bromobutide, bromofenoxim, bromoxynil, brompyrazon, butachlor, butafenacil, butenachlor, buthidazole, buthiuron, butroxydim, buturon, butyrate, cacodylic acid, cafenstrole, calcium chlorate, calcium cyanamide, cambendichlor, carbasulam, carboxazole, chlorprocarb, carfentrazone-ethyl, CDEA, CEPC, chlomethoxyfen, chloramben, chloranocryl, chlorazifop, chlorazine, chlorbromuron, chlorbufam, chloreturon, chlorfenac, chlorfenprop, chlorflurazole, chlorflurenol, chloridazon, chlorimuron, chlornitrofen, chloropon, chlorotoluron, chloroxuron, chloroxynil, chlorsulfuron, chlorthal, chlorthiamid, cinidon-ethyl, cinmethylin, cinosulfuron, cisanilide, clethodim, cliodinate, clodinafop-propargyl, clofop, clomazone, clomeprop, cloprop, cloproxydim, clopyralid, cloransulam-methyl, CMA, copper sulfate, CPMF, CPPC, credazine, cresol, cumyluron, cyanatryn, cyanazine, cycloate, cyclopyrimorate, cyclosulfamuron, cycloxydim, cycluron, cyhalofop-butyl, cyperquat, cyprazine, cyprazole, cypromid, daimuron, dalapon, dazomet, delachlor, desmedipham, desmetryn, di-allate, dicamba, dichlobenil, dichloralurea, dichlormate, 2-(2,4-dichlorophenoxy)propionic acid (dichlorprop), dichlorprop-P, diclofop-methyl, diclosulam, diethamquat, diethatyl, difenopenten, difenoxuron, difenzoquat, diflufenzopyr, dimefuron, dimepiperate, dimethachlor, dimethametryn, dimexano, dimidazon, dinofenate, dinoprop, dinosam, dinoseb, dinoterb, diphenamid, dipropetryn, diquat, disul, diuron, DMPA, DNOC, DSMA, EBEP, eglinazine, endothal, epronaz, EPTC, erbon, esprocarb, ethbenzamide, ethametsulfuron, ethidimuron, ethiolate, etobenzamid, ethofumesate, ethoxyfen, ethoxysulfuron, etinofen, etnipromid, etobenzanid, EXD, fenasulam, fenoprop, fenoxaprop, fenoxaprop-P-ethyl, fenoxaprop-P-ethyl+isoxadifen-ethyl, fenoxasulfone, fenteracol, fenthiaprop, fentrazamide, fenuron, ferrous sulfate, flamprop, flamprop-M, flazasulfuron, florasulam, fluazifop, fluazifop-P-butyl, fluazolate, flucarbazone, flucetosulfuron, fluchloralin, flufenacet, flufenican, flufenpyr-ethyl, flumetsulam, flumezin, flumiclorac-pentyl, flumioxazin, flumipropyn, fluometuron, fluorodifen, fluoroglycofen, fluoromidine, fluoronitrofen, fluothiuron, flupoxam, flupropacil, flupropanate, flupyrsulfuron, fluridone, flurochloridone, fluroxypyr, fluroxypyr-meptyl, flurtamone, fluthiacet, fomesafen, foramsulfuron, fosamine, fumiclorac, furyloxyfen, glufosinate, glufosinate salts and esters, glufosinate-ammonium, glufosinate-P-ammonium, glyphosate, glyphosate salts and esters, halauxifen, halauxifen-methyl, halosafen, halosulfuron-methyl, haloxydine, haloxyfop-methyl, haloxyfop-P-methyl, hexachloroacetone, hexaflurate, hexazinone, imazamethabenz, imazamox, imazapic, imazapyr, imazaquin, imazosulfuron, imazethapyr, indanofan, indaziflam, iodobonil, iodomethane, iodosulfuron, iodosulfuron-ethyl-sodium, iofensulfuron, ioxynil, ipazine, ipfencarbazone, iprymidam, isocarbamid, isocil, isomethiozin, isonoruron, isopolinate, isopropalin, isoproturon, isouron, isoxachlortole, isoxaflutole, isoxapyrifop, karbutilate, ketospiradox, lactofen, lenacil, linuron, MAA, MAMA, ester and amine of MCPA, MCPA-thioethyl, MCPB, mecoprop, mecoprop-P, medinoterb, mefenacet, mefluidide, mesoprazine, mesosulfuron, mesotrione, metam, metamifop, metamitron, metazachlor, metazosulfuron, metflurazon, methabenzthiazuron, methalpropalin, methazole, methiobencarb, methiozolin, methiuron, methometon, metoprotryne, methyl bromide, methyl isothiocyanate, methyldymron, metobenzuron, metobromuron, metolachlor, metosulam, metoxuron, metribuzin, metsulfuron, metsulfuron-methyl, molinate, monalide, monisouron, monochloroacetic acid, monolinuron, monuron, morfamquat, MSMA, naproanilide, napropamide, naptalam, neburon, nicosulfuron, nipyraclofen, nitralin, nitrofen, nitrofluorfen, norflurazon, noruron, OCH, orbencarb, ortho-dichlorobenzene, orthosulfamuron, oxadiargyl, oxadiazon, oxapyrazon, oxasulfuron, oxaziclomefone, oxyfluorfen, paraflufen-ethyl, parafluron, paraquat, pebulate, pelargonic acid, penoxsulam, pentachlorophenol, pentanochlor, pentoxazone, perfluidone, pethoxamid, phenisopham, phenmedipham, phenmedipham-ethyl, phenobenzuron, phenylmercury acetate, picloram, picolinafen, pinoxaden, piperophos, potassium arsenite, potassium azide, potassium cyanate, pretilachlor, primisulfuron-methyl, procyazine, prodiamine, profluazol, profluralin, profoxydim, proglinazine, prohexadione-calcium, prometon, prometryn, pronamide, propachlor, propanil, propaquizafop, propazine, propisochlor, propoxycarbazone, propyrisulfuron, propyzamide, prosulfalin, prosulfocarb, prosulfuron, proxan, prynachlor, pydanon, pyraclonil, pyraflufen-ethyl, pyrasulfotole, pyrazogyl, pyrazolynate, pyrazosulfuron-ethyl, pyrazoxyfen, pyribenzoxim, pyributicarb, pyriclor, pyridafol, pyridate, pyriftalid, pyriminobac, pyrimisulfan, pyrithiobac-sodium, pyroxasulfone, pyroxsulam, quinclorac, quinmerac, quinoclamine, quinonamid, quizalofop, quizalofop-P-ethyl, rhodethanil, rimsulfuron, saflufenacil, S-metolachlor, sebuthylazine, secbumeton, sethoxydim, siduron, simazine, simeton, simetryn, SMA, sodium arsenite, sodium azide, sodium chlorate, sulcotrione, sulfallate, sulfentrazone, sulfometuron, sulfosate, sulfosulfuron, sulfuric acid, sulglycapin, swep, SYN-523, trichloroacetic acid (TCA), tebutam, tebuthiuron, tefuryltrione, tembotrione, tepraloxydim, terbacil, terbucarb, terbuchlor, terbumeton, terbuthylazine, terbutryn, tetrafluoron, thiazafluron, thidiazimin, thidiazuron, thiencarbazone-methyl, thifensulfuron, thifensulfuron-methyl, thiobencarb, tiocarbazil, tioclorim, topramezone, tralkoxydim, triafamone, tri-allate, triasulfuron, triaziflam, tribenuron, tribenuron-methyl, tricamba, triclopyr choline salt, ester and salt of triclopyr, tridiphane, trietazine, trifloxysulfuron, trifluralin, triflusulfuron, trifop, trifopsime, trihydroxytriazine, trimeturon, tripropindan, tritac, tritosulfuron, vernolate, xylachlor, and salt, ester, optically active isomer, and mixture thereof.

The herbicidal composition of the present disclosure may be prepared or diluted during use. The herbicidal composition of the present disclosure may also be a concentrated composition, or a so-called "ready-to-use" composition, i.e., a composition for immediate use. Alternatively, the herbicidal composition of the present disclosure may be applied to a combined spray mixture composed of separate formulations of a single active ingredient, for example, a "tank mixing" form.

The herbicidal composition of the present disclosure may be used or prepared in any conventional form, for example: a three-package form, or for example: wettable powder (WP), emulsifiable concentrate (EC), microemulsifiable concentrate (MEC), water-soluble powder (SP), water-soluble concentrate (SL), suspoemulsion (SE), oil dispersant (OD), concentrated emulsion (BW), for example: oil-in-water and water-in-oil emulsions, sprayable solution or emulsion, capsule suspension (CS), suspension concentrate (SC), dried powder (DP), oil miscible solution (OL), seed dressing products, granules in the form of microparticles (GR), spray granules, coated granules and absorbent granules, granules used for applying or spreading in soil, water-soluble granules (SG), water-dispersible granules (WDG), ultra-low volume (ULV) formulations, microcapsules or waxes, these individual formulation types are known in the art.

Such an herbicidal composition may be formulated by using agricultural carrier, surfactant, or other application-promoting auxiliaries conventionally used in formulation techniques and formulation processes known in the art.

In one embodiment of the present disclosure, the total amount of active ingredients in the herbicidal composition may be about 0.1-99 wt. %, about 0.1-95 wt. %, or about 0.1-90 wt. %, based on the total weight of the herbicidal composition. In another embodiment, the total amount of active ingredients in the herbicidal composition accounts for about 20-40 wt. % of the total weight of the composition. In another embodiment, the total amount of active ingredients in the composition accounts for about 0.1%, 0.5%, 1%, 1.5%, 2%, 2.5%, 3%, 3.5%, 4%, 4.5%, 5% to about 90%, 93%, 95%, 98%, 99% of the total weight of the composition.

Aqueous forms for use may be prepared from emulsion concentrate, suspension, paste, wettable powder, or water-dispersible granule by adding water. In order to prepare emulsion, paste or oil dispersion, the components of the herbicidal composition may be taken by themselves or dissolved in an oil or solvent, and it may be homogenized in water by means of wetting agent, tackifier, dispersant or emulsifier. Alternatively, a concentrate may also be prepared, the concentrate comprises: active ingredients, wetting agent, tackifier, dispersant or emulsifier and, if necessary, a solvent or oil suitable for dilution with water.

The herbicidal composition may be applied before sprouting, after sprouting, or a combination thereof.

Method for Controlling Undesirable Vegetation

The present disclosure provides a method for controlling undesirable vegetation, which includes applying an herbicidally effective amount of the herbicide mixture or the herbicidal composition of the present disclosure to the undesirable vegetation or its location.

In one embodiment of the present disclosure, the undesirable vegetation is controlled in wheat. In one embodiment of the present disclosure, the wheat is winter wheat. In one embodiment of the present disclosure, the wheat is spring wheat.

In one embodiment of the present disclosure, the undesirable vegetation is selected from the group consisting of: *Aegilops tauschii* and *Lolium multiflorum* Lamk.

In one embodiment of the present disclosure, the herbicide mixture or the herbicidal composition may be applied before sprouting.

In one embodiment of the present disclosure, the herbicide mixture or the herbicidal composition is applied as a soil sealant.

In one embodiment of the present disclosure, the herbicide mixture or the herbicidal composition may be applied after sprouting.

In one embodiment of the present disclosure, it may be expected to control undesirable vegetation in crops such as corn, peanuts, soybeans, cotton, and the like.

In one embodiment of the present disclosure, the following undesirable vegetation may be expected to be controlled: *Medicago sativa, Amsinckia* spp., *Arctotheca calendula, Sinapis arvensis, Stellaria media, Buglossoides arvensis, Agropyron repens, Mentha arvensis, Crassula L., Cirsium arvense, Calystegia sepium, Tripleurospermum maritimum, Convolvulus arvensis, Aethusa cynapium, Galinsoga parviflora, Lamium amplexicaule, Sisymbrium officinale, Lythrum hyssopifolia, Sisymbrium orientale, Lolium multiflorum, Malva parviflora, Cerastium glomeratum, Matthiola longipetala, Echium plantagineum, Adonis microcarpa, Matricaria discoidea, Euphorbia pulcherrima, Lactuca serriola, Lamium purpureum, Papaver hybridum, Capsella bursa-pastoris, Chondrilla juncea, Rumex acetosella, Veronica hederifolia, Urtica urens, Juncus bufonius, Rapistrum rugosum, Raphanus raphanistrum, Brassica tournefo rtii, Polygonum aviculare, Mercurialis annua, Datura ferox, Neslia paniculata, Echinochloa crusgalli*, sugarbeet, *Fallopia convolvulus, Alopecurus myosuroides, Trianthema portulacastrum, Hirschfeldia incana, Tribulus terrestris, Abutilon theophrasti, Hypochaerisradicata, Galium aparine, Anthusa arvensis, Boragio officinales, Cotula australis, Senecio vulgaris, Galeopsis tetrahit, Urtica dioica, Spergula arvensis, Veronica filiformis, Verbesina encelioides, Eleusine indica, Rumex* spp., *Emex australis, Atriplex prostrata, Sherardia arvensis, Viola arvensis, Thlaspi arvense, Holcus lanatus, Fumaria L., Fumaria officinalis, Geranium* spp., *Geranium dissectum, Bromus diandrus, Plantago major, Digitaria ciliaris, Conringia orientalis, Heliotropium* spp., *Galeopsis* spp., *Marrubium vulgare, Sisymbrium orientale, Coronopusdidy mus, Matricaria* spp., *Matricaria recutita, Matricaria inodora, Calandrinia ciliata, Brassica juncea, Urtica fissa* E. Pritz., *Urtica* spp., *Solanum nigrum, Persicaria lapathifolia, Sonchus arvensis, Veronica persica, Chenopodium* spp., *Chenopodium album, Amaranthus powellii, Galeopsis intermedia, Persicaria maculosa, Amaranthus retroflexus, Anagallis arvensis, Urtica incisa, Sonchus oleraceus, Emex australis, Atriplex patula, Stachys arvensis, Erodium cicutarium, summer grass, Euphorbia helioscopia, Juncus bufonius, Polygonum convolvulus, Polygonum* spp., *Viola tricolor, Poa Annua, Avena fatua, Brassica napus*, and *Amsinckia calycina.*

In one embodiment of the present disclosure, the following undesirable vegetation may be expected to be controlled: *Alopecurus aequalis, Alopecurus japonicus, Beckmannia syzigachne, Sclerochloa kengiana, Poa annua* L., *Polypogon fugax, Bromus japonicus, Alopecurus myosuroides, Aegilops squarrosa, Avena fatua, Lolium multiflorum, Puccinellia distans, Phleum paniculatum, Euphorbia helioscopia, Vicia sativa, Malachium aquaticum, Stellaria media* L., *Capsella bursa-pastoris, Descurainia Sophia, Lithospermum arvense, Galium aparine, Veronica polita, Veronica persica, Silene conoidea, Cnidium monnieri, Lapsana apogonoides.*

In one embodiment of the present disclosure, the following undesirable vegetation may be expected to be controlled: *Setaria P*. Beauv., *Digitaria, Echinochloa* Beauv., *Capsella bursa-pastoris, Galium aparine* L., *Alopecurus aequalis* Sobol., and *Avena fatua* L.

In one embodiment of the present disclosure, the herbicide mixture or the herbicidal composition of the present disclosure is applied to *Aegilops tauschil.*

In one embodiment of the present disclosure, the herbicide mixture or the herbicidal composition of the present disclosure is applied to *Lolium multiflorum* Lamk.

In one embodiment of the present disclosure, the herbicide mixture or the herbicidal composition of the present disclosure is applied to *Aegilops tauschii*, wherein the application rate of pyroxasulfone is 45-90 g ai/ha, the application rate of chlorotoluron is 562.5-1125 g ai/ha, and the application rate of mesosulfuron-methyl is 5-10 g ai/ha.

In one embodiment of the present disclosure, the herbicide mixture or the herbicidal composition of the present disclosure is applied to *Aegilops tauschii*, and the weight ratio of pyroxasulfone, chlorotoluron and mesosulfuron-methyl is (40-100):(400-1250):(4-10). In a further embodiment, the weight ratio of pyroxasulfone, chlorotoluron and mesosulfuron-methyl is (45-90):(562.5-1125):(5-10). In a further embodiment, the weight ratio of pyroxasulfone, chlorotoluron and mesosulfuron-methyl is (8-10):(100-120):1. In a further embodiment, the weight ratio of pyroxasulfone, chlorotoluron and mesosulfuron-methyl is 9:112.5:1.

In one embodiment of the present disclosure, the herbicide mixture or the herbicidal composition of the present disclosure is applied to *Lolium multiflorum* Lamk, wherein the application rate of pyroxasulfone is 11.25-22.5 g ai/ha, the application of chlorotoluron is 140.625-281.25 g ai/ha, and the application rate of mesosulfuron-methyl is 1.25-2.5 g ai/ha.

In one embodiment of the present disclosure, the herbicide mixture or the herbicidal composition of the present disclosure is applied to *Lolium multiflorum* Lamk, and the weight ratio of pyroxasulfone, chlorotoluron and mesosulfuron-methyl is (5-30):(60-300):(0.5-3). In a further embodiment, the weight ratio of pyroxasulfone, chlorotoluron and mesosulfuron-methyl is (10-25):(120-300):(1-3). In a further embodiment, the weight ratio of pyroxasulfone, chlorotoluron and mesosulfuron-methyl is (11.25-22.5):(140.625-281.25):(1.25-2.5). In a further embodiment, the weight ratio of pyroxasulfone, chlorotoluron and mesosulfuron-methyl is (8-10):(100-120):1. In a further embodiment, the weight ratio of pyroxasulfone, chlorotoluron and mesosulfuron-methyl is 9:112.5:1.

In one embodiment of the present disclosure, the herbicide mixture or the herbicidal composition of the present disclosure is applied to *Aegilops tauschii*, wherein the application rate of pyroxasulfone is 45-180 g ai/ha (for example, 45-90 g ai/ha, or 90-180 g ai/ha), the application rate of chlorotoluron is 562.5-2250 g ai/ha (for example, 562.5-1125 g ai/ha), and the application rate of mesosulfuron-methyl is 5-20 g ai/ha (for example, 5-10 g ai/ha).

In one embodiment of the present disclosure, the herbicide mixture or the herbicidal composition of the present disclosure is applied to *Aegilops tauschii*, and the weight ratio of pyroxasulfone, chlorotoluron and mesosulfuron-methyl is (40-100):(400-1250):(4-10). In a further embodiment, the weight ratio of pyroxasulfone, chlorotoluron and mesosulfuron-methyl is (45-90):(562.5-1125):(5-10). In a further embodiment, the weight ratio of pyroxasulfone, chlorotoluron and mesosulfuron-methyl is (8-10):(100-120):1. In a further embodiment, the weight ratio of pyroxasulfone, chlorotoluron and mesosulfuron-methyl is 9:112.5:1.

In one embodiment of the present disclosure, the herbicide mixture or the herbicidal composition of the present disclosure is applied to *Aegilops tauschii*, and the weight ratio of pyroxasulfone, chlorotoluron and mesosulfuron-methyl is (20-360):(250-4500):(5-20). In a further embodiment, the weight ratio of pyroxasulfone, chlorotoluron and mesosulfuron-methyl is (40-200):(250-4500):(5-20). In a further embodiment, the weight ratio of pyroxasulfone, chlorotoluron and mesosulfuron-methyl is (40-200):(500-2500):(5-20). In a further embodiment, the weight ratio of pyroxasulfone, chlorotoluron and mesosulfuron-methyl is (45-180):(560-2250):(5-20).

In one embodiment of the present disclosure, the herbicide mixture or the herbicidal composition of the present disclosure is applied to *Aegilops tauschii*, and the weight ratio of pyroxasulfone, chlorotoluron and mesosulfuron-methyl is (40-200):(300-1500):(5-20). In a further embodiment, the weight ratio of pyroxasulfone, chlorotoluron and mesosulfuron-methyl is (80-200):(500-1200):(5-20). In a further embodiment, the weight ratio of pyroxasulfone, chlorotoluron and mesosulfuron-methyl is (90-180):(560-1125):(5-20). In a further embodiment, the weight ratio of pyroxasulfone, chlorotoluron and mesosulfuron-methyl is (3.5-5.5):(20-40):1; (7-11):(100-120):1; (26-46):(215-235):1; (4-5):(25-35):1; (8-10):(105-115):1; or (30-40):(220-230):1. In a further embodiment, the weight ratio of pyroxasulfone, chlorotoluron and mesosulfuron-methyl is 4.5:28.125:1; 9:112.5:1; or 36:225:1.

In one embodiment of the present disclosure, the herbicide mixture or the herbicidal composition of the present disclosure is applied to *Lolium multiflorum* Lamk, wherein the application rate of pyroxasulfone is 11.25-45 g ai/ha (for example, 11.25-22.5 g ai/ha), the application rate of chlorotoluron is 140.625-562.25 g ai/ha (for example, 140.625-281.25 g ai/ha), and the application rate of mesosulfuron-methyl is 1.25-5 g ai/ha (for example, 1.25-2.5 g ai/ha).

In one embodiment of the present disclosure, the herbicide mixture or the herbicidal composition of the present disclosure is applied to *Lolium multiflorum* Lamk, and the weight ratio of pyroxasulfone, chlorotoluron and mesosulfuron-methyl is (5-90):(60-1200):(1.25-2.5). In a further embodiment, the weight ratio of pyroxasulfone, chlorotoluron and mesosulfuron-methyl is (10-50):(120-600):(1.25-2.5). In a further embodiment, the weight ratio of pyroxasulfone, chlorotoluron and mesosulfuron-methyl is (11.25-45):(140.625-562.5):(1.25-2.5). In a further embodiment, the weight ratio of pyroxasulfone, chlorotoluron and mesosulfuron-methyl is (11.25-22.5):(140.625-281.25):(1.25-2.5). In a further embodiment, the weight ratio of pyroxasulfone, chlorotoluron and mesosulfuron-methyl is (8-10):(100-120):1. In a further embodiment, the weight ratio of pyroxasulfone, chlorotoluron and mesosulfuron-methyl is 9:112.5:1.

In one embodiment of the present disclosure, the herbicide mixture or the herbicidal composition of the present disclosure is applied to *Lolium multiflorum* Lamk, and the weight ratio of pyroxasulfone, chlorotoluron and mesosulfuron-methyl is (5-90):(60-800):(1-5). In a further embodiment, the weight ratio of pyroxasulfone, chlorotoluron and mesosulfuron-methyl is (5-90):(60-800):(1.25-5). In a further embodiment, the weight ratio of pyroxasulfone, chlorotoluron and mesosulfuron-methyl is (5-60):(120-600):(1-5). In a further embodiment, the weight ratio of pyroxasulfone, chlorotoluron and mesosulfuron-methyl is (5-60):(120-600):(1.25-5). In a further embodiment, the weight ratio of pyroxasulfone, chlorotoluron and mesosulfuron-methyl is (5-50):(130-580):(1-5). In a further embodiment, the weight ratio of pyroxasulfone, chlorotoluron and mesosulfuron-methyl is (5-50):(140-563):(1-5). In a further embodiment, the weight ratio of pyroxasulfone, chlorotoluron and mesosulfuron-methyl is (10-50):(130-580):(1-5). In a further embodiment, the weight ratio of pyroxasulfone, chlorotoluron and mesosulfuron-methyl is (11-45):(140-563):(1-5). In a further embodiment, the weight ratio of pyroxasulfone, chlorotoluron and mesosulfuron-methyl is (11.25-45):(140.625-562.5):(1.25-5). In a further embodiment, the weight ratio of pyroxasulfone, chlorotoluron and mesosulfuron-methyl is (8-10):(100-120):1. In a further embodiment, the weight ratio of pyroxasulfone, chlorotoluron and mesosulfuron-methyl is 9:112.5:1.

The herbicide mixture or the herbicidal composition of the present disclosure may be applied to undesirable vegetation locations by using conventional ground or aerial dusters, sprayers, and pellet applicators, and by other conventional methods known to those skilled in the art.

In one embodiment, the method for controlling undesirable vegetation of the present disclosure achieves a synergistic weeding effect. In a further embodiment, the method of controlling undesirable vegetation of the present disclosure achieves a synergistic effect on *Aegilops tauschii* and *Lolium multiflorum* Lamk.

In this disclosure, unless otherwise specified, the above descriptions about "herbicide mixture" and "herbicidal composition" are applicable to the descriptions about "a method for controlling undesirable vegetation", as if all the relevant descriptions are repeated herein. Similarly, where appropriate, the descriptions in this section regarding "a method for controlling undesirable vegetation" may also be applied to "herbicide mixture" and "herbicidal composition," as if all the relevant descriptions are repeated in the corresponding part above. For example, similar to the description of "herbicide mixture" and "herbicidal composition" in the present disclosure, in one embodiment of the method for controlling undesirable vegetation of the present disclosure, sulfonazole, chlorotoluron and mesosulfuron-methyl are applied in combination or sequentially. In one example, pyroxasulfone, chlorotoluron and mesosulfuron-methyl are separately prepared, and each of them is applied as it is, or diluted to a predetermined concentration for application. In another example, pyroxasulfone, chlorotoluron and mesosulfuron-methyl are separately prepared, and when being diluted to a predetermined concentration, they are mixed and then applied. In another example, pyroxasulfone, chlorotoluron and mesosulfuron-methyl are formulated together, and then applied as it is, or diluted to a predetermined concentration for application.

The Kit

The present disclosure provides a kit comprising the herbicide mixture or the herbicidal composition of the present disclosure.

In the present disclosure, unless otherwise specified, the above related descriptions about "herbicide mixture" and "herbicidal composition" are applicable to the descriptions about "kit", as if all the relevant descriptions are repeated herein.

In addition to the active ingredients (i.e., pyroxasulfone, chlorotoluron and mesosulfuron-methyl) comprised in the herbicide mixture described herein, the kit of the present disclosure may also comprise one or more other active ingredients and/or inactive ingredients, the active ingredients and the inactive ingredients may be provided in the herbicide mixture or provided independently.

In one embodiment of the present disclosure, the kit of the present disclosure comprises pyroxasulfone, chlorotoluron, and metsulfuron, and they are contained in the same container and optionally combined with a carrier.

In one embodiment of the present disclosure, the kit of the present disclosure comprises the herbicide mixture of the present disclosure, which is contained in a container.

In one embodiment of the present disclosure, the kit of the present disclosure comprises the herbicide mixture of the present disclosure, which is optionally combined with a carrier.

In one embodiment of the present disclosure, the kit of the present disclosure comprises the herbicidal composition of the present disclosure, which is contained in a container.

In one embodiment of the present disclosure, the kit of the present disclosure comprises pyroxasulfone, chlorotoluron, and metsulfuron, and each of them is contained in a separate container and optionally combined with a carrier.

In one embodiment of the present disclosure, the kit of the present disclosure comprises the herbicidal mixture of the present disclosure, and pyroxasulfone, chlorotoluron and mesosulfuron-methyl are each contained in a separate container and optionally combined with a carrier.

In one embodiment of the present disclosure, the kit of the present disclosure comprises the herbicidal composition of the present disclosure, and pyroxasulfone, chlorotoluron, mesosulfuron-methyl and the agricultural carrier are each contained in a separate container.

In one embodiment of the present disclosure, the kit of the present disclosure comprises the herbicidal composition of the present disclosure, and pyroxasulfone, chlorotoluron and mesosulfuron-methyl are each contained in a separate container, and the agricultural carrier is contained in a container containing pyroxasulfone, chlorotoluron, or metsulfuron-methyl.

In one embodiment of the present disclosure, the kit of the present disclosure also comprises instructions on how to apply pyroxasulfone, chlorotoluron, metsulfuron-methyl, the herbicide mixture of the present disclosure, or the herbicidal composition of the present disclosure to the location of the undesirable vegetation.

It should be recognized that, one or more features, aspects, or embodiments of the present disclosure may be combined with one or more other features, aspects, or embodiments of the present disclosure.

It should be recognized that, all embodiments of the present disclosure, including those specifically described for different aspects of the present disclosure, may be combined with any other embodiments of the present disclosure as appropriate.

EXAMPLES

The following examples do not limit the present disclosure, but merely illustrate how the present disclosure is implemented.

Referring to an article of Colby, S. R. i.e., Calculation of the synergistic and antagonistic response of herbicide combinations. *Weeds* 1967, 15, pp. 20-22 (which is incorporated herein in its entirety by reference), the theoretical value E0 of a given mixture of three active ingredients may be predicted according to the following equation, then evaluating whether there is synergy.

$$E0 = X \times Y \times Z \div 10000$$

wherein:

E0 is the theoretical fresh weight survival rate for the mixture of pyroxasulfone, chlorotoluron and metsulfuron;

X is the measured fresh weight survival rate for pyroxasulfone used alone in the same dosage as that in the mixture;

Y is the measured fresh weight survival rate for chlorotoluron used alone in the same dosage as that in the mixture;

Z is the measured fresh weight survival rate for mesosulfuron-methyl used alone in the same dosage as that in the mixture.

E is the measured fresh weight survival rate for the mixture of pyroxasulfone, chlorotoluron and mesosulfuron-methyl.

E0-E value is calculated to evaluate the combined effect of pyroxasulfone, chlorotoluron and mesosulfuron-methyl on the selected weeds.

Example 1: Soil Sealing Treatment by a Mixture of Pyroxasulfone, Chlorotoluron and Mesosulfuron-methyl for Controlling *Aegilops tauschil*

In this example, the herbicidal activity of a mixture of pyroxasulfone, chlorotoluron and mesosulfuron-methyl for soil sealing treatment to control *Aegilops tauschii* is investigated by a pot experiment method under the conditions of a glass greenhouse. This example is carried out in accordance with "NY/T 1155.4-2006 Guidelines for Indoor Bioassay Tests of Pesticides, Herbicides Part 4: Activity Determination Tests, Stem and Leaf Spray Method".

Source of Test Agent:

Pyroxasulfone: pyroxasulfone (850 g/Kg, WG) from Adama Agan LTD.

Chlorotoluron: chlorotoluron (90 wt %, WG) from Adama Agan LTD.

Mesosulfuron-methyl: Sigma (30 g/L, OD) from Bayer AG.

Test location: Greenhouse of Institute of Plant Protection, Shandong Academy of Agricultural Sciences Cultivation of test materials: The test soil is formed by mixing the 20 cm layer loam on the ground surface and the culture medium in a ratio of 3:1 as cultivation soil.

The test weeds are cultivated in a glass greenhouse at a temperature of 15-30° C. and natural light. A certain amount of *Aegilops tauschil* seeds are sown in a plastic pot with a diameter of 9 cm, covering with 1-2 mm soil, and putting them in an enamel dish filled with water. The bottom infiltration method is used to water them, waiting for the water to seep to the soil surface, and then transferring to a glass greenhouse for cultivation. The agents are applied on the second day after sowing *Aegilops tauschii* seeds.

Dosage and Formulation of the Liquid Agent

The dosages for each agent are shown in Table 1 below:

TABLE 1

| Agent | Dosage, g ai/ha |
|---|---|
| CK | — |
| Pyroxasulfone, 850 g/Kg WG | 180, 90, 45, 22.5, 11.25, 5.625 |
| Chlorotoluron, 90 wt % WG | 2250, 1125, 562.5, 281.25, 140.625, 70.3125 |
| Mesosulfuron-methyl, 30 g/L OD | 40, 20, 10, 5, 2.5, 1.25 |

For each active ingredient, the six dosages starting from the highest dosage are given in Table 1. For each active ingredient, the multiple dilution method is used to obtain the other five lower dosages from the highest dosage. A certain amount of agent is measured by pipette or balance, adding it directly to the water, and then diluting it to the required dosage by the multiple dilution method.

Spraying treatment: ASS-4 automatic control spraying system with a fan-shaped nozzle is used indoors to spray agent, the running speed is adjusted based on nozzle pressure, flow rate, etc. to spray 50 mL of chemical solution on the actual spray area of 1.1 $m^2$ (equivalent to 30 liters per mu), arranging the plastic pots to be processed on the spraying table evenly, and spraying evenly. The spraying pressure is 0.35 MPa, and the flow rate of the fan-shaped nozzle is 800 mL/min, spraying in order from low dosage to high dosage. Each treatment is repeated 3 times. After spraying, let it dry for one day, placing it in a glass greenhouse, and watering it regularly to keep moist.

Application time and frequency: the experiment is conducted on the second day after sowing *Aegilops tauschii* seeds, and the soil is evenly sprayed. The application time is Mar. 10, 2020, with one application.

Weed investigation method and time: after applying the agent, the symptoms of weed damage (such as growth inhibition, chlorosis, deformity, etc.) are recorded in detail. After 35 days, the fresh weight of aerial part of the weeds in each treatment is weighed, and the measured fresh weight inhibition rate and the measured fresh weight survival rate for each treatment are calculated according to the following equations:

$$\text{Measured fresh weight inhibition rate (\%)} = (\text{weight of the blank control treated fresh weeds} - \text{weight of the agent treated fresh weeds}) \div \text{weight of the blank control treated fresh weeds} \times 100$$

$$\text{Measured fresh weight survival rate (\%)} = 100 - \text{measured fresh weight inhibition rate (\%)}$$

Example 2: Soil Sealing Treatment by a Mixture of Pyroxasulfone, Chlorotoluron and Mesosulfuron-methyl for Controlling *Lolium multiflorum* Lamk Example 2 is substantively the same as Example 1, except that *Lolium multiflorum* Lamk is used instead of *Aegilops tauschii.*

The experimental results and calculation results of Examples 1-2 are shown in Table 2 below

TABLE 2

| Agent | Treatment (gai/ha) | *Aegilops tauschii* Measured fresh weight inhibition rate (%) | Measured fresh weight survival rate (%) — E | Theoretic fresh weight survival rate (%) — E0 | E0—E | *Lolium multiflorum* Lamk. Measured fresh weight inhibition rate (%) | Measured fresh weight survival rate (%) — E | Theoretic fresh weight survival rate (%) — E0 | E0—E |
|---|---|---|---|---|---|---|---|---|---|
| pyroxasulfone | 5.625 | −1.3 | 101.3 | — | — | 30.77 | 69.23 | | |
| | 11.25 | 2.6 | 97.4 | — | — | 46.15 | 53.85 | — | — |
| | 22.5 | 1.3 | 98.7 | — | — | 48.35 | 51.65 | — | — |
| | 45 | 20.78 | 79.22 | — | — | 79.12 | 20.88 | — | — |
| | 90 | 24.68 | 75.32 | — | — | 100 | 0 | — | — |
| | 180 | 45.45 | 54.55 | — | — | 100 | 0 | — | — |
| chlorotoluron | 70.3125 | −2.6 | 102.6 | — | — | 3.3 | 96.7 | | |
| | 140.625 | −1.3 | 101.3 | — | — | 8.79 | 91.21 | — | — |
| | 281.25 | 7.79 | 92.21 | — | — | 12.09 | 87.91 | — | — |
| | 562.5 | 18.18 | 81.82 | — | — | 16.48 | 83.52 | — | — |
| | 1125 | 27.27 | 72.73 | — | — | 74.73 | 25.27 | — | — |
| | 2250 | 63.64 | 36.36 | — | — | 100 | 0 | — | — |
| mesosulfuron-methyl | 1.25 | 3.9 | 96.1 | — | — | 3.3 | 96.7 | — | — |
| | 2.5 | 0 | 100 | — | — | 5.49 | 94.51 | — | — |
| | 5 | 5.19 | 94.81 | — | — | 16.48 | 83.52 | — | — |
| | 10 | 16.88 | 83.12 | — | — | 39.56 | 60.44 | — | — |
| | 20 | 28.57 | 71.43 | — | — | 60.44 | 39.56 | — | — |
| | 40 | 11.69 | 88.31 | — | — | 93.41 | 6.59 | — | — |
| Pyroxasulfone + chlorotoluron + mesosulfuron-methyl | 5.625 + 70.3125 + 0.625 | −1.3 | 101.3 | — | — | 81.32 | 18.68 | — | — |
| | 11.25 + 140.625 + 1.25 | 0 | 100 | 94.82 | −5.18 | 83.52 | 16.48 | 47.50 | 31.02 |
| | 22.5 + 281.25 + 2.5 | 5.19 | 94.81 | 91.01 | −3.80 | 87.91 | 12.09 | 42.91 | 30.82 |
| | 45 + 562.5 + 5 | 57.14 | 42.86 | 61.45 | 18.59 | 93.41 | 6.59 | 14.57 | 7.98 |
| | 90 + 1125 + 10 | 80.52 | 19.48 | 45.53 | 26.05 | 100 | 0 | 0 | 0.00 |
| | 180 + 2250 + 20 | 94.81 | 5.19 | 14.17 | 8.98 | 100 | 0 | 0 | 0.00 |

In Table 2 above, since the actual fresh weight inhibition rate % of mesosulfuron-methyl at an application rate of 0.625 gai/ha has not been measured, the E0-E value at this application rate cannot be calculated.

It can be seen from Table 2 that, each of the three active ingredients has poor control effect on *Aegilops tauschii*, wherein pyroxasulfone and chlorotoluron have certain effect on *Aegilops tauschii*, but mesosulfuron-methyl is substantively ineffective on *Aegilops tauschii*. Particularly, when the dosages of pyroxasulfone are 90 and 180 g ai/ha, the fresh weight inhibition rates of *Aegilops tauschii* are 24.68% and 45.45%, respectively; when the dosages of chlorotoluron are 1125 and 2250 g ai/ha, the fresh weight inhibition rate of *Aegilops tauschii* are 27.27% and 63.64%, respectively; while the soil sealing treatment by mesosulfuron-methyl is almost ineffective, and the highest fresh weight inhibition rate is only 28.57%. However, after the combination of the three, the effect is significantly improved, and it proves that the combination of the three has a strong synergistic effect.

In addition, it can be seen from Table 2 that, each of the three active ingredients has a certain effect on *Lolium multiflorum* Lamk, wherein pyroxasulfone has the best effect, and the other two are the second. The effect of the combination of the three is better, and the fresh weight inhibition rate may reach more than 80% even with the lowest dosage treatment, particularly the E0-E value reaches the high synergistic result of 31.02 and 30.82.

Example 3: Soil Sealing Treatment by a Mixture of Pyroxasulfone, Chlorotoluron and Mesosulfuron-methyl for Controlling *Aegilops tauschil*

Example 3 is substantively the same as Example 1, but more mixing ratios are tested.

The experimental results and calculation results of Example 3 are shown in Table 3 below:

TABLE 3

| Agent | Treatment (gai/ha) | Ratio | *Aegliops tauschii* Actual fresh weight inhibition rate % | Actual fresh weight survival rate (%) — E | Theoretic fresh weight Esurvival rate (%) — E0 | E-—E |
|---|---|---|---|---|---|---|
| pyroxasulfone | 45 | | 25.0 | 75.0 | — | |
| | 90 | | 48.3 | 51.7 | — | |
| | 180 | | 65.5 | 34.5 | — | |
| chlorotoluron | 562.5 | | 19.8 | 80.2 | — | |
| | 1125 | | 27.6 | 72.4 | — | |
| | 2250 | | 47.4 | 52.6 | — | |

TABLE 3-continued

| Agent | Treatment (gai/ha) | Ratio | *Aegliops tauschii* Actual fresh weight inhibition rate % | Actual fresh weight survival rate (%) — E | Theoretic fresh weight survival rate (%) — E0 | E0—E |
|---|---|---|---|---|---|---|
| mesosulfuron-methyl | 5 | | 6.9 | 93.1 | — | |
| | 10 | | 11.2 | 88.8 | — | |
| | 20 | | 23.3 | 76.7 | — | |
| pyroxasulfone + chlorotoluron+ mesosulfuron-methyl | 45 + 562.5 + 5 | 9:112.5:1 | 49.1 | 50.9 | 56.0 | 5.1 |
| | 45 + 562.5 + 10 | 4.5:56.25:1 | 55.2 | 44.8 | 53.4 | 8.6 |
| | 45 + 562.5 + 20 | 2.25:28.125:1 | 62.9 | 37.1 | 46.1 | 9.1 |
| | 45 + 1125 + 5 | 9:225:1 | 56.0 | 44.0 | 50.6 | 6.6 |
| | 45 + 1125 + 10 | 4.5:112.5:1 | 61.2 | 38.8 | 48.2 | 9.4 |
| | 45 + 1125 + 20 | 2.25:56.25:1 | 68.1 | 31.9 | 41.7 | 9.8 |
| | 45 + 2250 + 5 | 9:450:1 | 71.6 | 28.4 | 36.7 | 8.3 |
| | 45 + 2250 + 10 | 4.5:225:1 | 73.3 | 26.7 | 35.0 | 8.3 |
| | 45 + 2250 + 20 | 2.25:112.5:1 | 78.4 | 21.6 | 30.3 | 8.7 |
| | 90 + 562.5 + 5 | 18:112.5:1 | 69.8 | 30.2 | 38.6 | 8.4 |
| | 90 + 562.5 + 10 | 9:56.25:1 | 69.0 | 31.0 | 36.8 | 5.8 |
| | 90 + 562.5 + 20 | 4.5:28.125:1 | 78.4 | 21.6 | 31.8 | 10.3 |
| | 90 + 1125 + 5 | 18:225:1 | 67.2 | 32.8 | 34.9 | 2.1 |
| | 90 + 1125 + 10 | 9:112.5:1 | 77.6 | 22.4 | 33.3 | 10.8 |
| | 90 + 1125 + 20 | 4.5:56.25:1 | 75.0 | 25.0 | 28.7 | 3.7 |
| | 90 + 2250 + 5 | 18:450:1 | 84.5 | 15.5 | 25.3 | 9.8 |
| | 90 + 2250 + 10 | 9:225:1 | 82.8 | 17.2 | 24.2 | 6.9 |
| | 90 + 2250 + 20 | 4.5:112.5:1 | 87.1 | 12.9 | 20.9 | 7.9 |
| | 180 + 562.5 + 5 | 36:112.5:1 | 81.0 | 19.0 | 25.7 | 6.8 |
| | 180 + 562.5 + 10 | 18:56.25:1 | 83.6 | 16.4 | 24.5 | 8.2 |
| | 180 + 562.5 + 20 | 9:28.125:1 | 86.2 | 13.8 | 21.2 | 7.4 |
| | 180 + 1125 + 5 | 36:225:1 | 87.9 | 12.1 | 23.2 | 11.2 |
| | 180 + 1125 + 10 | 18:112.5:1 | 81.9 | 18.1 | 22.2 | 4.1 |
| | 180 + 1125 + 20 | 9:56.25:1 | 87.1 | 12.9 | 19.2 | 6.2 |
| | 180 + 2250 + 5 | 36:450:1 | 89.7 | 10.3 | 16.9 | 6.5 |
| | 180 + 2250 + 10 | 18:225:1 | 88.8 | 11.2 | 16.1 | 4.9 |
| | 180 + 2250 + 20 | 9:112.5:1 | 92.2 | 7.8 | 13.9 | 6.2 |

It can be seen from Table 3 that, the corresponding E0-E values of all the tested mixing ratios are greater than 0, thereby producing a synergistic effect. In addition, in the three ratios of pyroxasulfone, chlorotoluron and mesosulfuron-methyl: 4.5:28.125:1; 9:112.5:1; and 36:225:1; all of the E0-E values are greater than 10, thereby producing a significant synergistic effect.

The invention claimed is:

1. An herbicide mixture comprising pyroxasulfone, chlorotoluron and mesosulfuron-methyl wherein the weight ratio of pyroxasulfone, chlorotoluron and mesosulfuron-methyl is (90-180): (560-1125): (5-20).

2. The herbicide mixture according to claim 1, wherein the herbicide mixture consists of pyroxasulfone, chlorotoluron and mesosulfuron-methyl.

3. An herbicide mixture comprising pyroxasulfone chlorotoluron and mesosulfuron-methyl, wherein the weight ratio of pyroxasulfone, chlorotoluron and mesosulfuron-methyl is (3.5-5.5): (20-40): 1; (7-11): (100-120): 1; or (26-46): (215-235): 1.

4. The herbicide mixture according to claim 3, wherein the weight ratio of pyroxasulfone, chlorotoluron and mesosulfuron-methyl is 4.5:28.125:1; 9:112.5:1; or 36:225:1.

5. An herbicidal composition comprising the herbicide mixture according to claim 3 and at least one agricultural carrier, wherein the weight ratio of pyroxasulfone, chlorotoluron and mesosulfuron-methyl is 4.5:28.125:1; 9:112.5:1; or 36:225:1.

6. An herbicidal composition comprising active ingredients and at least one agricultural carrier, the active ingredients comprising pyroxasulfone, chlorotoluron, mesosulfuron-methyl, wherein the weight ratio of pyroxasulfone, chlorotoluron, and mesosulfuron-methyl is (90-180): (560-1125): (5-20).

7. The herbicidal composition according to claim 6, further comprising a surfactant.

8. The herbicidal composition according to claim 6, wherein the active ingredients consist of pyroxasulfone, chlorotoluron and mesosulfuron-methyl.

9. A method for controlling undesirable vegetation, which includes applying an herbicidally effective amount of the herbicide mixture according to claim 1 to the undesirable vegetation or its location.

10. The method according to claim 9, wherein the undesirable vegetation is controlled in wheat.

11. The method according to claim 9, wherein the undesirable vegetation is selected from the group consisting of: *Aegilops tauschii* and *Lolium multiflorum* Lamk.

12. A kit comprising the herbicide mixture according to claim 1.

* * * * *